United States Patent
Moddemann

(10) Patent No.: US 10,415,756 B2
(45) Date of Patent: Sep. 17, 2019

(54) TANK

(71) Applicant: COMITEN GBR, Bad Honnef (DE)

(72) Inventor: Horst Moddemann, Bad Honnef (DE)

(73) Assignee: COMITEN GBR (DE)

( * ) Notice: Subject to any disclaimer, the term of this patent is extended or adjusted under 35 U.S.C. 154(b) by 903 days.

(21) Appl. No.: 14/908,401

(22) PCT Filed: Jun. 5, 2014

(86) PCT No.: PCT/EP2014/061720
§ 371 (c)(1),
(2) Date: Jan. 28, 2016

(87) PCT Pub. No.: WO2015/014517
PCT Pub. Date: Feb. 5, 2015

(65) Prior Publication Data
US 2016/0161058 A1 Jun. 9, 2016

(30) Foreign Application Priority Data

Jul. 29, 2013 (DE) .......................... 10 2013 214 786

(51) Int. Cl.
*F17C 1/00* (2006.01)
*F17C 1/10* (2006.01)
(Continued)

(52) U.S. Cl.
CPC .................. *F17C 3/04* (2013.01); *F17C 1/14* (2013.01); *F17C 1/16* (2013.01); *F17C 3/06* (2013.01);
(Continued)

(58) Field of Classification Search
CPC ................ F17C 1/002; F17C 2201/035; F17C 2203/011; F17C 2203/012;
(Continued)

(56) References Cited

U.S. PATENT DOCUMENTS 1,694,967 A * 12/1928 Coolidge .............. A47J 41/022
159/24.1
2,439,562 A * 4/1948 Cunningham ......... B64D 37/06
220/4.14
(Continued)

FOREIGN PATENT DOCUMENTS

DE 10335245 3/2005
DE 102009029245 3/2011
(Continued)

OTHER PUBLICATIONS

PCT International Search Report, International Patent Application No. PCT/EP2014/061720, dated Sep. 23, 2014, 3 pages.
(Continued)

*Primary Examiner* — Frantz F Jules
*Assistant Examiner* — Erik Mendoza-Wilkenfel
(74) *Attorney, Agent, or Firm* — Barnes & Thornburg LLP

(57) ABSTRACT

The invention relates to a tank comprising a container with an opening and a cover, a flexible casing lying against the interior and exterior of the container. This allows increased resistance to the penetration of sharp objects, liquid and gaseous gases can be used interchangeably and various gas types with a fossil-type and biological-type consistency can be mixed and also heated and cooled in the tank. The invention relates to tanks (1) and staged tanks of the preceding claims, characterized in that in addition to LNG, said tanks can store biological methane gas.

19 Claims, 10 Drawing Sheets

Figure 1:
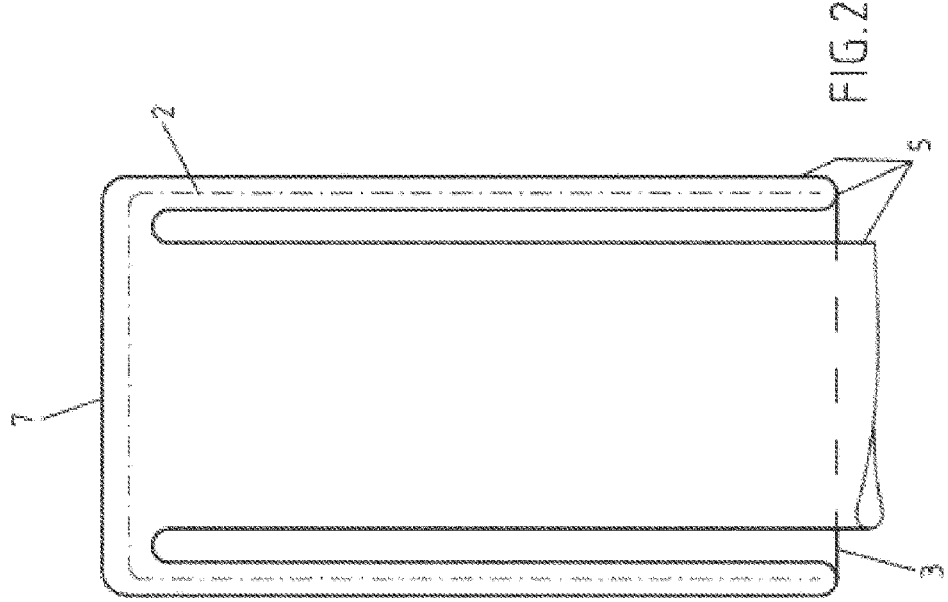

(51) Int. Cl.
| | |
|---|---|
| F17C 3/00 | (2006.01) |
| F17C 3/06 | (2006.01) |
| F17C 5/00 | (2006.01) |
| F17C 5/06 | (2006.01) |
| F17C 3/04 | (2006.01) |
| F17C 1/14 | (2006.01) |
| F17C 1/16 | (2006.01) |
| F17C 5/02 | (2006.01) |
| F17C 6/00 | (2006.01) |
| F17C 13/00 | (2006.01) |

(52) U.S. Cl.
CPC ............... *F17C 5/007* (2013.01); *F17C 5/02* (2013.01); *F17C 5/06* (2013.01); *F17C 6/00* (2013.01); *F17C 13/001* (2013.01); *F17C 2201/0109* (2013.01); *F17C 2201/0119* (2013.01); *F17C 2201/056* (2013.01); *F17C 2203/0604* (2013.01); *F17C 2203/0607* (2013.01); *F17C 2203/0621* (2013.01); *F17C 2203/0624* (2013.01); *F17C 2203/0639* (2013.01); *F17C 2203/0643* (2013.01); *F17C 2203/0646* (2013.01); *F17C 2203/0663* (2013.01); *F17C 2203/0685* (2013.01); *F17C 2205/0134* (2013.01); *F17C 2205/0142* (2013.01); *F17C 2205/0305* (2013.01); *F17C 2205/0311* (2013.01); *F17C 2205/0332* (2013.01); *F17C 2205/0338* (2013.01); *F17C 2205/0341* (2013.01); *F17C 2205/0355* (2013.01); *F17C 2209/232* (2013.01); *F17C 2209/234* (2013.01); *F17C 2221/012* (2013.01); *F17C 2221/033* (2013.01); *F17C 2223/0123* (2013.01); *F17C 2223/0161* (2013.01); *F17C 2223/033* (2013.01); *F17C 2223/035* (2013.01); *F17C 2223/036* (2013.01); *F17C 2223/043* (2013.01); *F17C 2223/045* (2013.01); *F17C 2223/046* (2013.01); *F17C 2225/0123* (2013.01); *F17C 2225/0161* (2013.01); *F17C 2225/033* (2013.01); *F17C 2225/035* (2013.01); *F17C 2225/036* (2013.01); *F17C 2225/046* (2013.01); *F17C 2225/047* (2013.01); *F17C 2227/0135* (2013.01); *F17C 2227/0157* (2013.01); *F17C 2227/0316* (2013.01); *F17C 2227/0341* (2013.01); *F17C 2227/0358* (2013.01); *F17C 2227/0379* (2013.01); *F17C 2227/0381* (2013.01); *F17C 2227/0383* (2013.01); *F17C 2250/032* (2013.01); *F17C 2250/0426* (2013.01); *F17C 2260/035* (2013.01); *F17C 2265/033* (2013.01); *F17C 2265/063* (2013.01); *F17C 2265/065* (2013.01); *F17C 2265/066* (2013.01); *F17C 2270/0139* (2013.01); *F17C 2270/0168* (2013.01); *F17C 2270/0171* (2013.01); *F17C 2270/0178* (2013.01); *Y02E 60/321* (2013.01)

(58) Field of Classification Search
CPC ........ F17C 2203/013; F17C 2203/0604; F17C 2203/0629; F17C 2203/066; F17C 2203/0621; F17C 2203/0658; F17C 2203/0663; F17C 2203/0665; F17C 2203/0668; F17C 2203/0673; F17C 2203/0675; F17C 2221/012; F17C 2209/232; F17C 2209/234; F17C 2205/013; F17C 2205/0142; F17C 3/00; F17C 3/022; F17C 3/005; F17C 2203/0602; F17C 2203/0607; F17C 2203/0614; F17C 2203/0619; F17C 2203/0624; F17C 2203/0631; F17C 5/00; F17C 5/06

See application file for complete search history.

(56) References Cited

U.S. PATENT DOCUMENTS

| | | | |
|---|---|---|---|
| 3,409,061 A | 11/1968 | Struble, Jr. | |
| 3,828,960 A * | 8/1974 | Walles | A47J 41/022 215/13.1 |
| 4,101,045 A * | 7/1978 | Roberts | B63B 25/12 220/1.5 |
| 4,360,116 A | 11/1982 | Humphrey | |
| 6,655,156 B1 | 12/2003 | Miksic et al. | |
| 7,117,908 B1 | 10/2006 | Coron | |
| 2004/0089440 A1 | 5/2004 | Sanders | |
| 2005/0087536 A1* | 4/2005 | Caudill | F17C 1/14 220/586 |
| 2012/0000916 A1* | 1/2012 | Kleber | F16J 12/00 220/590 |
| 2014/0130896 A1* | 5/2014 | Mayr | F17C 13/002 137/263 |

FOREIGN PATENT DOCUMENTS

| | | |
|---|---|---|
| GB | 2356211 | 5/2001 |
| WO | 2004026716 | 4/2004 |
| WO | 2011026965 | 3/2011 |

OTHER PUBLICATIONS

English Translation of PCT Notification of Transmittal of Translation of the International Preliminary Report on Patentability and Written Opinion, International Application No. PCT/EP2014/061720, dated Feb. 17, 2016, 6 pages.

PCT Notification Concerning Transmittal of International Preliminary Report on Patentability, International Application No. PCT/EP2014/061720, dated Feb. 17, 2016, 2 pages.

* cited by examiner

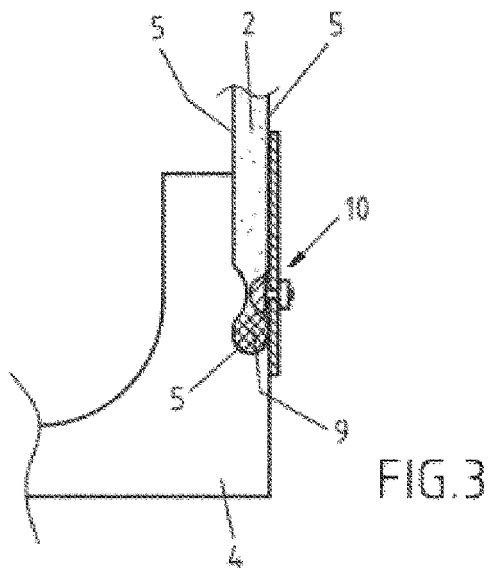
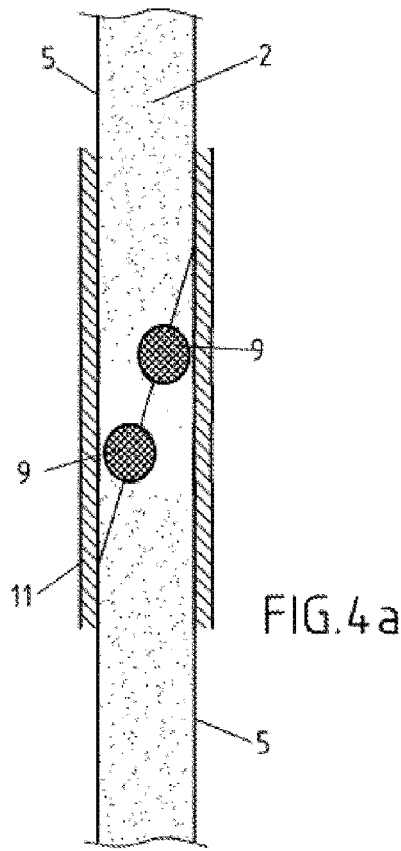
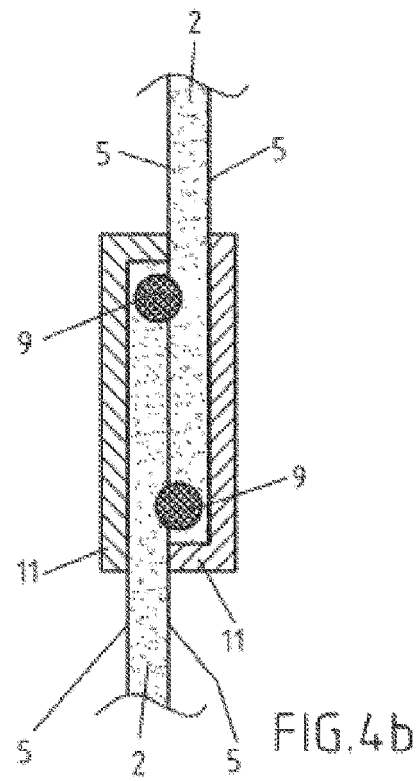

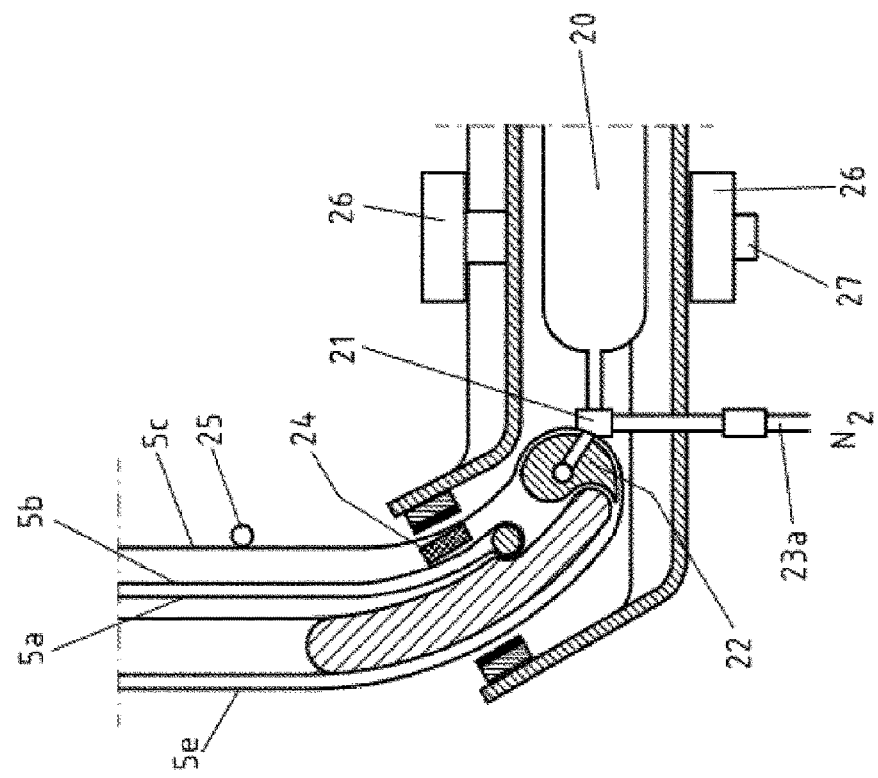
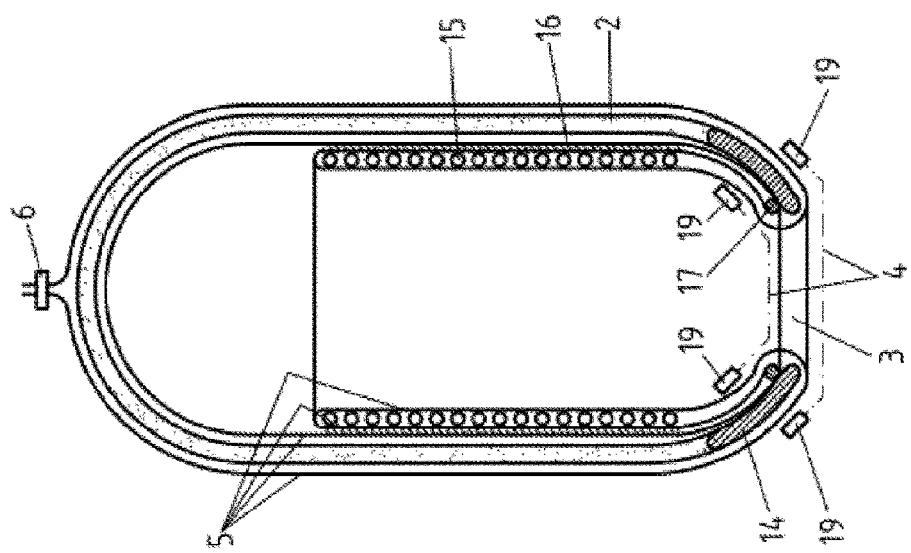
FIG.6a
FIG.6

TANK

CROSS-REFERENCE TO RELATED APPLICATIONS

This application is a national stage entry under 35 USC § 371(b) of PCT International Application No. PCT/EP2014/061720, filed Jun. 5, 2014, and claims the benefit of German Patent Application No. 102013214786.4, filed Jul. 29, 2013, both of which are expressly incorporated by reference herein.

The invention relates to a tank, in particular a high-safety tank, preferably for the accumulation and storage of a cryogenic medium, as per the preamble of the main claim.

In some sectors of industry, modern tanks for accumulating and storing media have to satisfy high safety requirements, for example in the case of tanks for gasoline, kerosene or combustible gases. Tanks for the transportation of radioactive substances or cryogenic media, for example, are subject to particularly high safety requirements, and should in particular be designed to be safe in the event of a crash, such that leaks even in the event of impact of sharp objects or splinters such as projectiles can be prevented.

Owing to the risk to the environment in the event of damage to a tank or high-safety tank for the transportation of the abovementioned hazardous substances, for example as a result of a traffic accident, a tank of said type must be able to withstand extreme external action of force and ambient conditions. The production outlay, size and weight of such tanks are therefore very high.

Cryogenic tanks, that is to say tanks for the accumulation and storage of a cryogenic medium, for example hydrogen or methane gas, are normally produced from particularly highly alloyed metallic materials, predominantly nickel-steel compounds, in order to be safe in the event of a crash and resistant to cold temperatures. To achieve adequate insulation, cryogenic tanks generally have particularly high-grade thermal insulation, which is commonly realized by way of a double-wall construction with an interposed vacuum layer or an interposed granulate filling layer. In the case of the storage and accumulation of LNG (liquefied natural gas), it is necessary to maintain temperatures of down to approximately $-164°$ C. under normal pressure, or even approximately $-253°$ C. in the case of liquefied hydrogen gas.

The volume density of cryogenic fuels such as LNG in the cryogenic state below the boiling point is higher by a factor of 600 than that in the gaseous phase. A cryogenic tank can therefore be designed to be considerably more space-saving even than a high-pressure tank. For example, the volume of a 200 bar tank is still generally greater by a factor of 3 to 4 than that of LNG. Tanks for hydrogen gas are commonly of bulky spherical shape in order to be able to withstand the high gas pressure. Therefore, despite the high production outlay and weight, cryogenic tanks are used for transport on land, on sea and in the aerospace sector.

For the use of a tank for accumulating a cryogenic medium as a fuel for a transportation means, it is furthermore necessary for the tank to also be suitable for tank replenishment under pressure. Since heating of a cryogenic tank has the effect that the cryogenic medium stored therein generally partially evaporates and forms a so-called boil-off gas, it is sought, during a tank replenishment process, for the boil-off hazards arising as a result of heat transfer into the tank from the outside to be as far as possible prevented, or reduced to a minimum. During replenishment of cryogenic gas into a "warmed" tank, that is to say into a tank above the setpoint temperature, it is furthermore generally necessary to perform suction extraction of evaporated gas or boil-off gas, wherein the suction-extracted gases must be captured or temporarily stored, which is cumbersome.

In the automobile industry in particular, it is therefore sought to realize solutions for overcoming the abovementioned problems and for achieving easier operability in order to permit a widespread introduction of future-oriented and environmentally friendly fuels also for heavy goods motor vehicles, passenger motor vehicles and other small road-going vehicles.

The problem addressed by the invention is that of providing a further developed tank.

To solve the problem, provision is made of a tank, in particular a high-safety tank, preferably for the accumulation and storage of a cryogenic medium, having a container which provides an opening and a cover. A flexible cladding bears against the container at the inside and at the outside.

By means of the flexible cladding which bears against the container at the inside and at the outside, it is possible for a tank to be provided which is safe in the event of a crash and which, in a particularly effective manner, counteracts damage and leaks as a result of the impact of sharp objects.

In relation to a rigid surface, a flexible cladding can better absorb the kinetic energy of an impacting sharp object by way of deformation work of the cladding, and thus more effectively counteract piercing of the cladding.

The invention is based on the realization that a larger surface area can correspondingly perform greater deformation work, and thus the resistance of the cladding with respect to piercing sharp objects increases with the size of the surface area of the flexible cladding.

By way of a flexible cladding which bears against the container not only at the inside or at the outside but at the inside and at the outside, the largest possible surface area is made possible, thus making possible to realize the greatest possible protection against leakages of the cladding.

Furthermore, a flexible cladding is likewise particularly resistant to mechanical loads such as can arise for example in the event of an accident, for example tensile, compressive and torsion forces. Furthermore, a flexible cladding can be fitted in a particularly simple manner.

If the flexible cladding is adequately resistant to mechanical loads and is likewise impermeable and resistant to cold temperatures, it is possible for same design of tank to be used for the storage and accumulation of a multiplicity of different media, for example for the tank to be used as a liquefied gas tank or as a gas tank for high-pressure storage.

If the tank is used for the accumulation of a cryogenic fuel in a vehicle, the fact that the cladding can absorb particularly little heat in relation to a metal wall comes to bear with particularly advantageous effect. Gas evaporation, or the boil-off effect, can thus be counteracted. Furthermore, by way of the flexible cladding, which bears against the container at the inside and at the outside, cooling can be simultaneously permitted, whereby the boil-off effect during tank replenishment and during relatively long standstill periods of the vehicle can be reduced or almost entirely eliminated.

In one embodiment, the cladding of the tank is of unipartite form.

Unipartite means that the cladding is not composed of multiple area parts that are connected to one another, but rather, the cladding has been produced in one piece from one base material. The base material of a unipartite cladding may in this case comprise multiple parts and materials, for example a material woven from fibers or a multi-layer foil.

The unipartite design relates only to the cladding itself. A cladding whose edges are connected to one another or to an adjacent body by way of a connecting means is likewise unipartite within the context of the present invention.

By way of the unipartite design of the cladding, it is possible to achieve greater resistance to piercing, sharp objects. A unipartite cladding makes it possible to realize a particularly large base material area of homogenous properties in relation to a multi-part cladding. Inhomogeneous area regions are generally less resistant to loads, and can therefore constitute the starting point for leakages. By way of a unipartite cladding, it is possible for inhomogeneous area regions, which arise basically as a result of a connection to one another or to adjacent bodies, to be reduced.

Furthermore, through the provision of a unipartite cladding, joining steps that would be required in the case of a multi-part cladding for the assembly process can be eliminated, and the cladding can furthermore be produced by series production, that is to say inexpensively, as a semifinished part. A tank can thus be provided with particularly little production outlay.

In one embodiment, the cladding is of hose-like or stocking-like form.

A hose-like form or stocking-like form can be preproduced in unipartite form and thus makes it possible, by being folded over at the opening of the container, to realize abutment against the container at the inside and at the outside with a large homogenous surface. Particularly great resistance of the cladding to piercing, sharp objects can be achieved in this way.

A cladding of hose-like form or stocking-like form can furthermore be installed with particularly little outlay.

In one embodiment, an opening of the cladding is closed off in non-positively locking or positively locking fashion, for example by twisting and clamping or adhesive bonding.

Through the closure of an opening of the cladding, it is possible for a container to be fully lined with one unipartite cladding. Additional area pieces, and associated relatively large inhomogeneous connecting regions or connecting seams, can thus be eliminated. Twisting of an opening of the cladding is a particularly simple way of closing an opening. The cladding undergoes relatively little weakening as a result of twisting. By means of a non-positively locking or positively locking connection, it is possible to realize closure of the opening in a particularly simple manner, in particular by way of a clamped or adhesive connection.

In one embodiment, the cladding is a flexible foil or a woven material, which is preferably highly impermeable to gas, resistant to tearing and pressure-resistant and/or resistant to large temperature fluctuations close to the absolute zero point of 0 K, that is to say −273° C., and which is based in particular on aramide, graphene or carbon nanotubes. Optionally, the flexible foil or the woven material may also be provided with impregnation, a protective lining or coating.

By means of a flexible foil or a woven material, it is possible for a cladding of small thickness, and thus a tank of low weight and small dimensions, to be provided. Furthermore, a flexible foil or a woven material can be folded over at the opening of the container, and thus makes it possible to realize a large, homogenous surface, which can furthermore be realized with little installation outlay.

The cladding is for example a cladding reinforced with aramide or composed of aramide, for example a cladding reinforced with aramide fibers, hereinafter referred to as aramide cladding. Aramide fibers are commercially marketed by the DuPont company under the trademark Kevlar®, and are also offered in a woven configuration that is impermeable to gas. The weave structure can be changed in the weaving process, such that a flexible cladding can be provided, for example in hose-like or stocking-like form.

An aramide cladding or Kevlar cladding is particularly resistant to mechanical loads and is at the same time adequately resistant to cold temperatures for the accumulation of, for example, cryogenic media such as LNG (liquefied natural gas) or liquid helium. Furthermore, an aramide cladding is impermeable to gas and chemically inert, that is to say resistant to corrosion.

Graphene, developed by the Nobel prizewinner Prof. Andre Greim from Russia, who has worked for many years in Great Britain, refers to a material which comprises a two-dimensional structure of carbon atoms (graphite). Graphene is extremely thin, impermeable to gas and likewise particularly resistant to mechanical loads. Furthermore, graphene is electrically conductive and antibacterial and can be adhesively connected to foils or to woven aramide, that is to say for example adhesively bonded to foamed material.

Carbon nanotubes, also referred to as CNT, are small tubular structures or molecular nanotubes composed of carbon. The structure of a carbon nanotube corresponds to that of a rolled-up graphene tube. The characteristics of a cladding composed of carbon nanotubes may be similar to those of an aramide cladding or of a cladding composed of graphene.

Graphene and carbon nanotubes may basically be provided as a foil or as fibers, and exhibit high resistance to tearing and a high yield strength. Graphene is furthermore electrically highly conductive and antibacterial and exhibits particularly high resistance to surface wear.

In one embodiment, the cladding is a woven material, composed preferably of aramide fibers, which has varying diameters and/or varying densities, for example in a longitudinal extent of the cladding.

Organic, high-strength fibers and synthetic fibers can, like aramide fibers, likewise be woven to form a cladding with varying diameters and densities, for example to form a hose-like or stocking-like form with varying diameters and density distribution along the longitudinal axis. Through the possibility of realizing a particular density distribution across the flexible cladding, it is possible for the mechanical characteristics of the flexible cladding, for example the yield strength, to be influenced targetedly and locally.

A cladding composed of woven material with varying diameters and/or varying densities can be adapted particularly precisely to the tank geometry and interfaces or connecting points with respect to adjacent bodies. A particularly high level of safety in the event of a crash can be achieved in this way. Furthermore, the flexibility with regard to the design of the cladding supports the use of the cladding for the cooling of the tank.

In one embodiment, the cladding bears in wound form against the container in multiple layers at the inside and/or at the outside.

In this case, in wound form in multiple layers means that the cladding, for example in stocking-like form, has been inserted into the container, folded over at the opening of the container, twisted at the container base, and inserted into the container again, several times over. Multiple wound layers then bear against the container.

By means of a cladding in wound form in multiple layers, which cladding bears against the container either only at the inside or only at the outside or else at the inside and at the outside, it is possible for the surface area of the cladding to be further enlarged, and thus for greater resistance to piercing, sharp objects to be achieved.

The cladding may for example bear against the container in one layer at the outside and in three layers at the inside, whereby not only a particularly high level of safety but also cooling of the tank can be made possible.

In one embodiment, the container of the tank is produced from a compressible and/or thermally insulating material, for example foamed material.

By means of a compressible material, the resistance of the tank to piercing sharp objects can be additionally increased, because in this way, the container can perform a particularly great amount of deformation work. However, particularly high resistance to mechanical loads such as may arise for example in the event of an accident, for example tensile, compressive and torsion forces, can also be achieved in this way.

Through the provision of a thermally insulating material for the container, the tank can be used for the storage and accumulation of media which demand that the maintenance of either very high or very low temperatures. As an example, reference is made to tanks for cryogenic media, for example for LNG or liquid methane gas with an atmospheric storage temperature of approximately −164° C., or liquid hydrogen with an atmospheric storage temperature of approximately −253° C. A cumbersome insulation device, for example double-wall construction with an interposed vacuum or an interposed granulate filling, can thus be omitted.

Foamed material is a particularly inexpensive, thermally insulating and compressible material which makes it possible to realize the above-described advantageous effects.

In one embodiment, the container and/or the container wall is coated, or equipped with a primary cladding, on the inside and/or on the outside.

A primary cladding is a normally dimensionally stable layer which is independent of the flexible cladding of the main claim and which is arranged between the container wall and the abovementioned flexible cladding and which bears against the container, that is to say against the container wall. Instead of bearing against the container, it is also possible to provide an areal, firm bond of the coating or the primary cladding to the container or the surface of the container wall.

The container preferably has a primary cladding based on graphene. It is however basically also possible for the coating or primary cladding to be constructed on the basis of aramide or carbon nanotubes.

In particular in the case of a container composed of different material thicknesses with good insulating action and composed of foamed material or polyurethane foamed material, it is possible to realize particularly high dimensional stability, a high-strength assembly and a high level of gas impermeability by way of graphene applied to both sides, in particular by way of a graphene primary cladding of stocking-like form. A material assembly of said type is particularly suitable as a core structure or container of a tank in the aerospace sector.

A primary cladding may likewise be in the form of a multiplicity of very thin aluminum foils, such as are used in the space sector for protection against cold radiation, and thus make it possible, in addition to the wall thickness of the foamed material, to realize a particularly good insulation action. In the latter case, the primary cladding composed of aluminum foils may additionally be covered with a simple polyethylene cladding, also referred to as PE cladding, in order to protect the tank body structure.

By means of a container with a coating or primary cladding provided at the inside and/or at the outside, it is possible to achieve twofold protection against piercing, sharp objects and to achieve the further abovementioned advantageous characteristics and effects of said materials.

In one embodiment, the cover, which adjoins the cladding of the container, is connected to the opening in positively locking, non-positively locking and/or cohesive fashion, in particular by way of a self-expanding element, a shape memory element or a screw or adhesive connection. The cover is thus connected to the cladding that bears against the container.

Optionally, the contact region of the container may be replaced or underpinned by a sealing ring composed of pressure-resistant material, wherein the sealing ring, adjoining the container, is encased together with the container by the flexible cladding. Particularly high pressure stability and durability of the tank, even in the case of frequent opening and closing of the cover, can be achieved in this way.

By way of a positively locking, non-positively locking and/or cohesive connection, it is possible to realize a cover-container connection which can be particularly impermeable, pressure-resistant and resistant to mechanical loads.

A self-expanding sealing element or element is a body composed of a material, or is a device or pyrotechnic means, which is increased in volume severalfold by way of a triggering mechanism. A known example of a self-expanding element is the self-expanding component of an airbag.

A shape memory element is a body composed of a material, or is a device, which can assume a predetermined shape by way of a triggering mechanism.

An example of a shape-memory element is a metallic body with nickel-titanium alloy, such as for example nitinol.

By means of a self-expanding element or a shape-memory element, a mechanically particularly reliable positively locking or non-positively locking connection can be generated or can be triggered by pyrotechnic measures. Screw connections or adhesive connections can be realized in a particularly straightforward and inexpensive manner.

In one embodiment, the cover has at least one passage and/or one or more valves.

By way of a cover with passage openings or a passage, filling and emptying of the tank is made possible without the need to open the cover. Such a passage may therefore be advantageous both in the case of a cover that is fixedly connected to the container and in the case of a cover which permits opening and closing. Moreover, a valve makes it possible to provide an overpressure protection means or some other typical means for which a valve can normally be used.

In one embodiment, as the material of the cover and/or of a component which is connected to the cover, which adjoins the cover or which is led through the cover, for example a valve or a feed and discharge line, a high-grade nickel steel is used, in particular with a nickel fraction of approximately 20%. The use of said material permits a very low coefficient of expansion at very low temperatures, and thus a particularly good sealing action in the case of positively locking or non-positively locking connections, such as for example screw connections.

In one embodiment, the tank has only one opening and only one cover for closing off the opening. By means of a tank with only one opening and only one cover, it is possible for all control elements and feed lines and discharge lines of the tank to pass through the cover or to be arranged centrally on the cover, whereby particularly easy operability and a high level of safety and a weight saving can be achieved.

In one embodiment, the container is narrowed toward the opening and/or the opening is of oval-shaped form, wherein the container preferably has a pressure-resistant material in the region of the opening in order, in particular, to provide resistance and purchase for the closure forces of the cover and for the weight of the cover with its gas connectors.

A container which is narrowed toward the opening makes it particularly easily possible, in the same manner as an oval-shaped opening, to provide a cover which can be opened and closed. Here, a container is particularly preferred which narrows toward the opening and in the case of which the opening is also oval-shaped. In all of the design alternatives mentioned above, it is possible by way of a pressure-resistant material, that is to say for example a pressure-resistant plastic or metal, to achieve particularly great wear resistance and durability of the cover-opening interface.

In one embodiment, the cover can assume an open position and a closed position, wherein the cover comprises, in particular, an inner part relative to the container and an outer part relative to the container, and the two parts preferably have a magnet element.

A cover which can assume an open position and a closed position, that is to say can be opened and closed, can be closed in a particularly impermeable and reliable manner, and opened, through the provision of an inner part relative to the container and an outer part relative to the container. The basic principle is already used, in modified form, in submarine and aircraft engineering for doors, which must be closed in particularly pressure-tight fashion.

Through the provision of magnet elements at mutually opposite positions on the inner part and outer part of the cover, it is possible, in the closed position, by way of the additional magnetic attraction force between the two parts, to realize particularly impermeable closure of the cover with respect to the container.

In one embodiment, the cover may comprise at least two parts which are connected to one another in preferably non-positively locking or positively locking fashion, in particular by way of a self-expanding element or a shape-memory element.

A container which is in at least two parts can be produced particularly easily, in particular a particularly long container or a container which narrows toward the opening. The advantageous effects in the connection of two bodies by way of a self-expanding element or a shape-memory element have already been described with regard to the container-cover connection.

In one embodiment, the cladding bears in wound form against the container in multiple layers at the inside such that the cladding forms a closed chamber in which, in particular, there is arranged a spiral-shaped encircling cooling line, wherein a preferably temperature-dependent and/or pressure-dependent feed and discharge of coolant is provided.

To produce said embodiment of a tank, the cladding, which is for example of stocking-like form, is inserted with the closed end into the container, and the open end of the cladding is folded over into the interior of the container or in the direction of the container center such that a second, inner, cylindrical layer of the cladding is formed. Another fold-over toward the interior of the container is performed at the base of the container. The cladding is laid on further as far as the opening of the container such that, in the interior of the container, three layers of the same cladding bear, one on top of the other, against the container and cylindrically encase the internal volume of the container. The open end of the cladding is folded over outward at the opening of the container and is guided along the outer side of the container until the open end of the cladding converges at a point on the outer base of the container and can, for example, be firmly clamped in sealed fashion. A particularly high level of safety in the event of a crash and particularly good insulation can be achieved in this way.

A good insulation action can be achieved if the closed cylindrical chamber formed by the cladding in the interior of the container is filled with a compacted granulate in the form of, for example, plastics pellets and subjected to a vacuum.

Alternatively, the closed cylindrical chamber formed by the cladding in the interior of the container may also be equipped with a spiral-shaped encircling cooling line which, in the case of a rigid form of the cooling line, is subjected to a vacuum and can thus likewise support the insulation action of the cladding.

If a coolant is fed into the cooling line, the tank can be cooled. The tank can likewise be cooled if no cooling lines are provided and a coolant is supplied directly into the chamber formed by the cladding. Such cooling makes it possible for the boil-off effect during tank replenishment and during relatively long standstill periods of the vehicle can be reduced or almost entirely eliminated.

The cooling of the tank may also be further developed by virtue of a control unit being provided for a temperature and/or pressure-dependent feed and discharge of the coolant. If the gas pressure in the cryogenic tank rises above a predetermined threshold value, refrigerant is fed in. Thus, the gas pressure in the cryogenic tank falls, and the coolant throughput can be reduced until a predefined threshold temperature in the cryogenic tank is reached. This refrigeration action must be dependent on the cooling capacity carried on board, that is to say the amount of coolant stored under high pressure.

The cladding chamber that can be directly filled with coolant, or the spiral-shaped cooling line, may moreover be designed such that, when coolant is fed in, the cladding chamber or the cooling line expand and increase the surface area. The cladding chamber could for example expand and contract in the manner of an accordion. A particularly good cooling action can be achieved in this way.

In the case of a tank with above-described cooling being used in a vehicle, it is possible, through the elimination or reduction of the boil-off effects during tank replenishment and during everyday operation, to permit particularly simple operability for a user during the tank replenishment operation.

In a further embodiment, a vertical orientation of the tank is provided, with a feed line for the filling of the tank being provided on the top side of the tank. During a tank replenishment process of a tank for LNG fuel, it is possible, by way of the vertical installation and the feed line on the top side of the tank, to achieve that a cooling device projects into the extracted amount of liquid, that is to say the evaporated amount of gas is cooled. It is thus possible to avoid a situation in which more CH4 and N2 form in the upper region of the tank, which are lighter than the rest of the tank contents and which can damage the engine owing to a lower methane number and knocking resistance, such as is presently the case with conventional LNG tanks; this effect must be compensated by engine developers with additional outlay or by way of a reduction in power.

In a further embodiment, more than one flexible and in particular stocking-like cladding is provided, said claddings being shaped and wound such that the claddings can form closed chambers in the interior of the container, which chambers can project in flower-like fashion into the tank. As a result of the filling with coolant, it is thus possible for the gas, which is under boil-off pressure, to be cooled, and for the pressure in the tank to be reduced. A vacuum pump may furthermore be used in order to pump off the coolant, for example N2 gas, such that the cladding chambers that project into the tank contract again in order to provide adequate space for accommodating fuel.

In a further embodiment, a vacuum insulation is provided between the inner part and the outer part of the cover. Particularly high insulation performance can be achieved in this way.

A further aspect of the invention relates to a staged tank having several of the tanks described above, wherein the multiple tanks are connected to one another such that a medium can pass from one into another of the multiple tanks, in particular through a line system, a controller and/or a circuit for targeted and variable connection of the multiple tanks.

In this case, a medium may be a liquid substance or a gaseous substance. Said term likewise encompasses both the liquid phase and the gaseous phase of one substance. In the latter case, it is then possible for dedicated connections of the multiple tanks for the respectively different phases of the medium to be provided, for example one connecting line for a liquid phase and another connecting line for a gaseous phase.

The advantages of a staged tank are numerous. Depending on the available structural space or required capacity, a staged tank can be adapted flexibly to the respective requirements by way of the connection of an arbitrary number of the multiple tanks.

For the storage of media that must be stored under high pressure, a staged tank makes it possible, owing to the arbitrarily selectable number of the multiple tanks, to achieve greater space utilization, that is to say the storage and accumulation of more medium per unit of available structural space. This is because a tank that can withstand a high pressure permits a longer service life under boil-off conditions, because, for example, the boiling point rises and is at a relatively high pressure, of >20 bar, even at −120° C. A tank equipped with an aramide/Kevlar inliner can, with low weight and small volume, withstand an internal pressure of up to 250 bar, with regard to strength and sealing action, even in the case of a cylindrical design. In the case of a single tank in a normally rectangular available structural space, the pressures are limited. Furthermore, more outlay must be expended for insulation and boil-off stability, and it is possible for the first time to realize CNG/LNG operation which is compliant with the tank replenishment intervals and ranges in even a sparse LNG and CNG refueling station network, in the development phase of methane fuel. The staged tank with multiple tanks of in each case small diameter permits greater space utilization and energy efficiency.

In the manner described above, it is thus possible for a staged tank to be positioned, for example, in space-saving fashion in a motor vehicle, for example on the rear side or above a driver's cab of a heavy goods motor vehicle, for the accumulation and provision of fuels, such as liquefied gas, for example LNG, for the drive of the vehicle. The storage of liquefied gas requires a pressure-resistant and crash-resistant tank which is resistant to cold temperatures. Said requirements can be met by way of the staged tank described above.

In the case of the storage of liquefied gas, boil-off gases arise in the event of the tank warming up. Through the use of a staged tank for this application, as per the embodiment described above, the following synergistic effect can be achieved: the boil-off gases that are generated can be conducted, in the CNG/LNG staged tank with inliner, from the centrally arranged tanks of the multiple tanks to the outer tanks of the multiple tanks, which are generally subject to more intense heating and in which, consequently, increased amounts of boil-off gases are generated in any case. The boil-off gases that are collected in the outer tanks of the multiple tanks can be utilized directly for driving the heavy goods motor vehicle, and can thus be particularly easily discharged and utilized in energy-efficient fashion. The cooling of the staged tank as a whole can thus be improved. Increased efficiency and a greater range of the vehicle with one tank filling is thus made possible.

A further special feature is the utilization of LNG and liquid biological methane gas in a common tank. The mixing of the biomethane with LNG can be performed, by way of the cover, by injection from at least one nozzle which, in the same way as the hollow tension bolt 26 or 27, is led through both cover parts, at least one feed pipe line has fitted the biomethane circularly around the tension bolt, equipped with a mixing nozzle, injects the biomethane fuel into the LNG that has already been introduced into the tank and mixes it with LNG. Wherein one feed line is sufficient and the distribution over multiple individual nozzles have been incorporated into the inner cover. Good admixing of the biomethane gas is definitive for good combustion in the engine. It is however also of significance for refueling stations and fuel distribution stations, because otherwise the relatively high-percentage biomethane of relatively low density collects in the upper tank and, upon extraction, the consistency of the fuel changes. The mixing of the LNG with biological methane gas may also be performed during the fuel supply process simply by way of a circulating pump.

FIG. 1 shows a tank 1 having a container 2, having an opening 3 of the container 2 and having a cover 4 which closes off the opening 3. A flexible cladding 5 bears against the container 2 at the inside and at the outside. The cladding 5 is of stocking-like form. The closed end 7 of the cladding 5 bears against the base of the container 2 in the interior. The stocking-like cladding is furthermore folded over at the opening 3, that is to say is led from the inside to the outside. The open end of the stocking-like cladding is twisted, and connected in non-positively locking fashion by way of a clamping fastener 6, on the outside of the container base. The stocking-like cladding is of unipartite form and is produced from woven aramide/Kevlar fibers. To further increase the resistance of the tank 1 to damage, the container 2 may be equipped with a graphene coating 8 before the attachment of the cladding 5. The container-cover connection 12 may be realized by way of a thread or an adhesive connection, wherein the cover 4 also adjoins the cladding 5 in the region of the container-cover connection 12. One or more devices 13 for conducting the medium in and out by way of a line, a valve, a controller and/or circuit are likewise schematically illustrated in the tank 1 depicted in FIG. 1.

Figure 2:
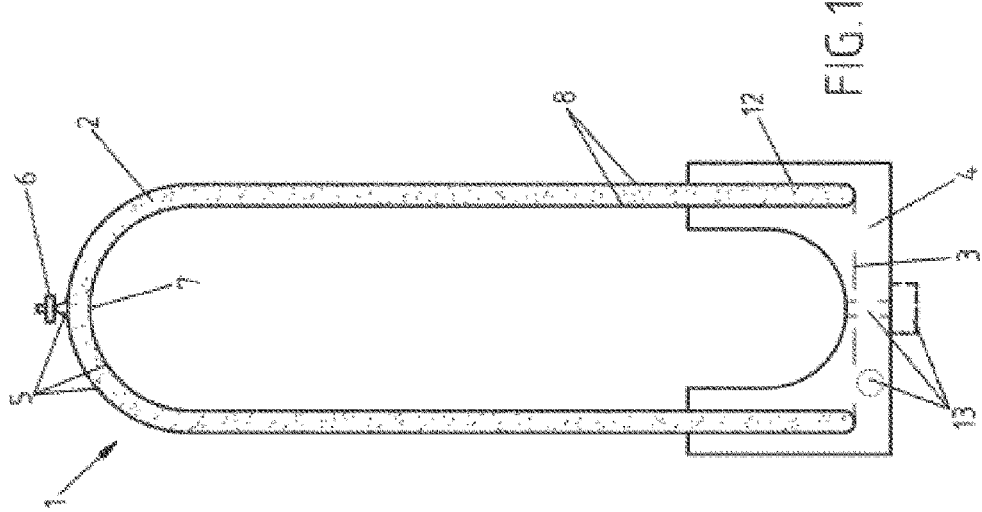

FIG. 2 schematically shows a further exemplary embodiment of a tank, in the case of which, by contrast to the first exemplary embodiment, the stocking-like cladding 5 bears with the closed end 7 of the cladding 5 against the outside of the container base. The cladding 5 is likewise folded over at the opening 3, and thus bears against the container 2 at the outside and at the inside. In FIG. 2, the container 2 is merely indicated by a dash-dotted line. By virtue of the cladding 5 being folded over again at the base in the interior of the container 2, the cladding 5 bears in wound form against the container 2 in multiple layers at the inside.

By way of twisting at the base in the interior of the container 2, the cladding 5 may optionally bear not only against the cylindrical inner container walls but also against the base in the interior of the container 2.

Further exemplary embodiments, which are not included in the figures, encompass tanks 1 in which the container 2, analogously to the exemplary embodiments described above, has a stocking-like or hose-like cladding 5 wound around it multiple times, wherein the closed end 7 of the cladding 5 bears against the container either at the inside or at the outside, and the cladding is folded over and/or twisted multiple times.

FIG. 3 shows a positively locking and at the same time non-positively locking connection of the container 2 to the cover 4, which adjoins the cladding 5 of the container 2. The connection is realized with the aid of a self-expanding element 9, in order to make it possible to realize a particularly intense sealing action. A wedge device 10, which can be clamped from the outside, makes it possible for the self-expanding element 9 to be enclosed by the cladding 5. By virtue of the expansion reaction being triggered, a positively locking and non-positively locking connection is formed between container 2 and cover 4. It is optionally possible for a pressure-resistant container material to be used in the connecting region.

FIGS. 4a and 4b show a tank (1) with a container composed of at least two parts, which parts are connected in the region of the cylindrical container wall likewise by way of clamping means 11 and self-expanding elements 9. A reliable and sealed connection can be provided in this way.

Figure 5:
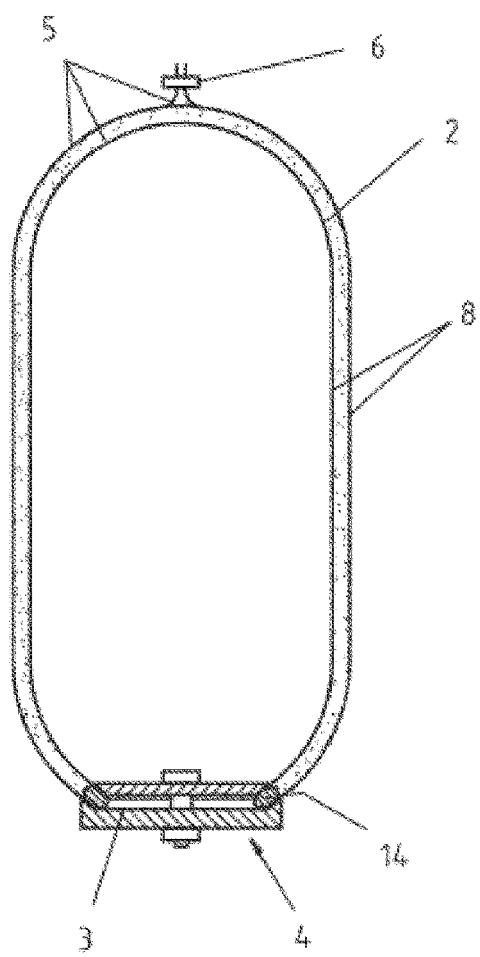

FIG. 5 shows a vertically or horizontally installed tank for the storage and accumulation of a hydrogen cryogenic fuel. The external holding apparatus of the tank is not illustrated in FIG. 5. In the case of a horizontal orientation, an inclination of approximately 2° is advantageous in order that the medium can flow more easily in the direction of the opening. The container 2 is narrowed toward the opening 3. The opening 3 is of oval shape. The container 2 is reinforced in the region of the opening by way of a pressure-resistant material 14. One part of the cover 4, having an inner part and an outer part, can be opened and closed with the aid of the oval opening 3 in such a way that, by rotation of the inner part, both a leadthrough through the opening 3 and clamping of the container 3 between the inner part and outer part in the region of the pressure-resistant material 14 are made possible. A particularly reliable, sealed closing action can be achieved in this way.

The tank illustrated in FIG. 5 can be utilized in particular for the underground storage of a cryogenic fuel at a refueling station. To further increase security against damage to the tank and to the surroundings, and to at the same time achieve improved thermal insulation, the tank may lie horizontally on an aramide honeycomb interlayer plate. It is optionally advantageously possible for the entire structural space to be lined in space-saving fashion with aramide honeycomb interlayer plates.

The tank 1 illustrated in FIG. 1 may be either an individual tank or one of the multiple tanks 1 of a staged tank with multiple tanks 1 arranged adjacent to one another and connected to one another by lines 13.

FIG. 6 shows a cryogenic tank with integrated cooling. The cooling of the tank is achieved by virtue of the coil of the stocking-like closed part initially being inserted into the container 2 composed of preferably coated insulating foam. At the opening 3 of the container 2, the stocking cladding is folded inward again over a clamping sealing ring 17, and is led to the cover 4 at the outlet of the container 2 again, such that a cylindrical interior space with small diameter difference is formed, which interior space can be filled with a coolant. A spiral-shaped cooling line 15 or a spiral-shaped encircling nitrogen hose has been inserted into said closed chamber formed by the cladding 5. The filling with coolant is performed, with gas pressure control and regulation with the aid of a controller, through a feed line 22 and discharge line 23a (FIG. 6a).

As coolant, use is preferably made of nitrogen at a temperature of −200° C. Nitrogen as coolant has the advantage that, in the event of a leak of a coolant line, the engine can continue to burn the LNG fuel stored in the tank despite additional nitrogen fractions, thus permitting onward travel, and, with the fault being displayed and the implementation of reduced power, engine damage can be prevented.

If the gas pressure in the cryogenic tank now increases beyond a predetermined threshold value, coolant is fed in. Thus, the gas pressure in the cryogenic tank falls, and the coolant throughput can be reduced until a predefined threshold temperature in the cryogenic tank is reached. This refrigeration action must be dependent on the cooling capacity carried on board, that is to say the amount of nitrogen stored under high pressure. The spiral-shaped feed line to the tank is at the same time a type of expandable duct for the cooling of the tank. Furthermore, the cooling system shown has the advantage that the cylindrical cooling chamber lies in the manner of a cooling shield around the cryogenic, still-liquid methane gas or hydrogen and shields the latter to the outside by way of its enlarged heat-conducting surface.

A further cooling configuration is shown in FIG. 6a. Here, it is possible for the spiral-shaped cooling line 15 to be dispensed with. The expansion of the coolant, for example $N_2$, is realized by way of one or more expanders 20 which are installed on the outer part of the cover 4. In addition to an expander 20, a regulating unit for the coolant may preferably also be provided. Thus, the cover 4 is cooled in an effective manner. A regulating valve 21 controls the refrigeration capacity in the tank. The distributor ring with ring seal 22 composed of solid material (metal or plastic) is placed into the final reversal loop 5c/5e, and is fixedly connected to the Kevlar cladding. It is only at this location that the Kevlar stocking is pierced through at least two times (outlet and inlet), but is situated outside the transported fuel and is also secured by way of the sealing magnetic fasteners 19 and the tension anchor 26.

Figure 6B:
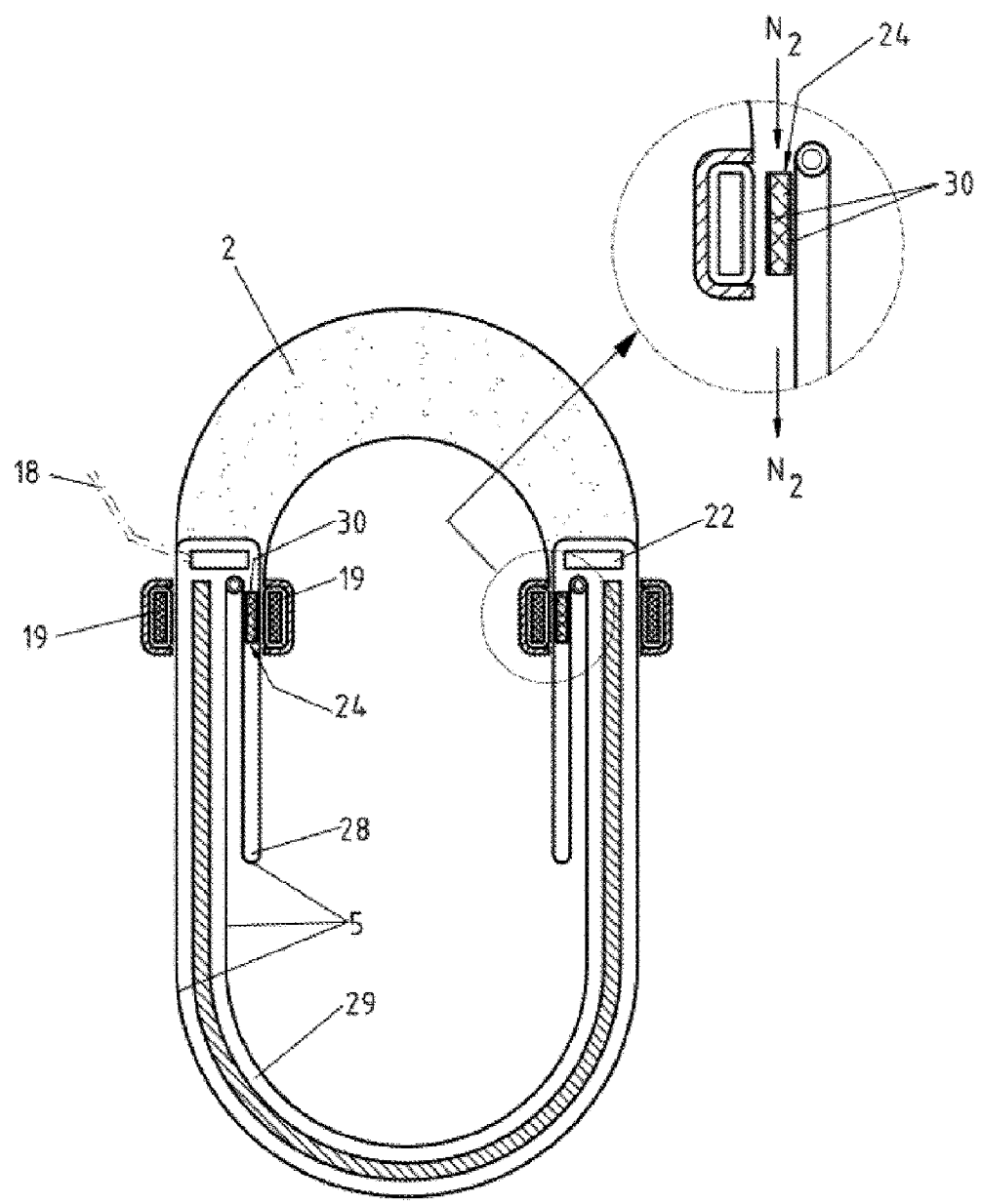

The cooling gases are conducted downward through the cover to the distributor valve and/or are circulated by way of the feed line 23a and/or discharge line 23b (on the opposite side; not illustrated in FIG. 6b). The coolant, conducted into the loop 5b/5c, will flow through an open-pored foamed metal pressure plate 24. The loop 5b/5c will deform in circular fashion under coolant internal pressure. In order that said loop takes on a controlled shape, the hose 5b/5c is equipped with one or more ring clamps 25 which are fitted during the installation process. Instead of a ring clamp 25, it is also possible for a rigid aramide mesh to be used for constricting the cooling hose 5b/5c in order to define the shape in the expanded state.

As already mentioned, the cover 4 has a twofold sealed closure by way of magnets 19 and the screw fastener 26. The main feed and extraction of gas take place through the screw fastener 26 of the cover 4 by way of a line 27 through the screw fastener 26.

The LNG fuel is a fossil, non-renewable fuel, because it is produced from purified natural gas by way of the supercooling process. In future, biological methane gas will be admixed to said LNG because the base molecule $CH_4$ is identical in both fuels. The amount of admixing is definitive for how environmentally friendly and sustainable the new fuel is. An admixture of 20% biomethane to the LNG already yields a net CO2 reduction of 50% in relation to current gas engines. The mixing of biomethane with LNG can be performed, via the cover, ideally by way of injection from at least one nozzle, which is guided through both cover parts in the same way as the hollow tension bolts 26 and 27 but which has a feed pipeline with biomethane which, fitted circularly around the tension bolts, is equipped with a mixing nozzle. Wherein one feed line is sufficient and the distribution over multiple individual nozzles can be incorporated via the inner cover. Good admixing of the biomethane gas is definitive for good combustion in the engine. It is however also of significance for refueling stations and fuel distribution stations, because otherwise the relatively high-percentage biomethane of relatively low density collects in the top of the tank. The good mixing may also be realized within the tank by way of the cover.

A further cooling configuration is shown in FIG. 6b. Here, a hose-stocking inner coil with a cylindrical, straight opening is provided. The magnets 19 are permanent magnets in a flexible rubber seal or printing-process seal with pyrotechnics or pressurized gases or hydraulics. The feed and discharge lines 18 and 22 fill the cooling hose 28 with coolant which has already expanded in the outer region and, with a required pressure that is slightly above the internal pressure of the tank chamber, with nitrogen. To increase the capacity of the tank, it is likewise possible for a vacuum to be generated in the cooling hose 28 by way of the feed and discharge line 18. The generation of a vacuum between flexible cladding 5 and container 2 may optionally be used for achieving particularly close abutment of the flexible cladding 5. The foamed metal pressure plate 24 comprises a porous, open-pored foamed metal which is permeable to coolant, for example aluminum foam, and is surrounded by pressure plates 30. It is thus possible in a particularly simple manner, and without additional lines, for coolant to be transported from outside the tank to the cooling hose 28.

A cooling configuration may likewise be configured as a hose-stocking outer coil, wherein the cooling hose 28 may lie outside the tank contents 29. This has the advantage that the cooling hose 28, in the event of leakage, is situated not in the tank but in the outer region between container 2 and tank contents.

If the vertically standing tank is rotated through 180°, it is thus possible for the boil-off gas to be cooled by way of the cooling hose 28, and for the service life to thus be increased.

Independently of the invention described until this point, a further invention, specifically a fuel accumulator device for CNG/LNG, will be disclosed below together with a method. One or more tanks according to the following invention may advantageously be configured as per the above-described tank according to the invention together with its advantageous refinements. The following description relates to the further invention.

The further invention relates to a fuel accumulator device having at least two pressure-resistant tank containers for a motor vehicle that is operated with gas, specifically in particular a motor vehicle that is operated with natural gas, and to a natural-gas-fuelled vehicle, together with a method.

A natural-gas-fuelled vehicle is operated with compressed natural gas, that is to say with compressed CNG, as fuel, which is stored in pressurized tanks of the fuel accumulator device. In general, multiple pressure tanks of relatively large volume are filled with compressed natural gas. The pressure prevailing in the pressurized tanks is generally up to 250 bar. A natural-gas-fuelled vehicle is equipped with an internal combustion engine as drive assembly. The range and payload of such vehicles is approximately 30% to 50% lower in relation to vehicles operated using diesel or gasoline.

To be able to perform a tank replenishment process in a natural-gas-fuelled vehicle, natural gas must firstly be transported from a natural gas source to the refueling station. Transportation of natural gas by way of heavy goods vehicles to the refueling station is relatively expensive, because a heavy goods vehicle can transport only relatively small amounts (approximately 5 t) of compressed natural gas, specifically in relation to oil (30 t). This problem could be overcome by virtue of natural gas being transported in liquefied form, that is to say as so-called LNG.

Document EP 0 211 115 A1 has disclosed a fuel accumulator device for a natural-gas-fuelled vehicle that is operated with gas, which fuel accumulator device comprises cylinders composed predominantly of steel, that is to say pressure containers, which function as tank containers. Natural gas can be stored under high pressure in the pressure containers.

DE 10 2006 051 916 A1 has disclosed a motor vehicle which can be operated with different fuels such as natural gas-based fuel and cryogenic fuel. The vehicle therefore comprises at least two different fuel accumulators, wherein one fuel accumulator serves for the accumulation of the cryogenic fuel. Hydrogen is provided as cryogenic fuel.

DE 10 2008 011 456 A1 has disclosed the refueling of a motor vehicle with liquid natural gas, that is to say with LNG.

A problem addressed by the further invention is that of making it possible to realize long ranges of a motor vehicle that is operated with gas, in particular natural gas.

The fuel accumulator device provided for solving the problem comprises at least two pressure-resistant tank containers for the accumulation of gas, specifically in particular of natural gas and/or biological methane gas. These are for example at least two cylindrical pressure containers which may be composed of steel. It is the intention for highly compressed gas to be able to be stored at very high pressure in one of the two tank containers, which are of pressure-resistant design. A pressure-resistant container within the meaning of the present further invention is a container which can withstand an internal pressure considerably higher than atmospheric pressure. At least one of the two pressure containers, that is to say pressure-resistant tank containers, is in particular designed such that the pressure may amount to at least 100 bar, preferably at least 200 bar, for example up to 250 bar. A cryogenic gas, specifically in particular LNG and/or bioLNG can be stored at least in one of the containers or tank containers. A tank container is thus designed to be correspondingly resistant to cold temperatures.

By means of the solution, it is made possible to refuel with and use LNG for covering large distances, which leads to long ranges without the need to ensure, over many days, a reliquefaction of LNG that has evaporated in the tank container (so-called boil-off gas). For onward travel, it suffices for either LNG or CNG to be available at a refueling station.

A further advantage of the further invention consists in that a refueling station can have LNG shipped to it, and said LNG can be at least partially directly introduced into a motor vehicle tank of a natural-gas-fuelled vehicle without prior evaporation. Furthermore, if LNG is evaporated at a refueling station said type, said evaporation can be utilized for generating a high pressure in order to thereby reduce the load on a compressor which is susceptible to faults and which has high energy consumption.

Tanked natural gas contains different amounts of energy depending on the pipeline gas or production site used. As an unrefined, fossil natural resource, natural gas remains laden with substances that cannot be utilized for energy generation. By contrast, LNG has in each case been previously purified in order that it can be suitably liquefied. For this reason, too, it is advantageous for a vehicle to be able to be refueled not only with CNG but also with LNG, because it burns more cleanly and in a more energy-efficient manner.

The initial temperature of LNG during atmospheric refueling is basically approximately −163° C. boiling temperature. Since the tank container in which LNG is stored is of pressure-resistant design, LNG can be stored and replenished at high pressures of, for example, up to 20 bar, preferably up to 200 bar. A tank vessel of said type can thus withstand a pressure of at least 20 bar, preferably of at least 200 bar. Owing to the high pressure, the boiling point of LNG is raised. At a pressure of approximately 200 bar, the boiling point is <−100° C. Therefore, in the case of a correspondingly pressure-resistant tank container, no boil-off gas will be generated over a relatively long period of time. This effect is also referred to as refrigeration block effect. The vehicle can therefore be parked for a relatively long period of time without the risk of excessively high pressures arising owing to boil-off gas. Should excess boil-off gas nevertheless form, it is possible for the one or more further pressure-resistant tank containers to be utilized for receiving boil-off gas.

In one embodiment of the further invention, the fuel accumulator device comprises an additional consumer of boil-off gas, which can consume gas independently of the engine. The additional consumer may be an engine-independent heating system. The additional consumer may be a small gas turbine with generator for generating electricity, or a fuel cell or an electrical battery. If excess boil-off gas forms, this can be consumed by the additional consumer. If boil-off gas is consumed by the additional consumer, this prevents excess boil-off gas that has formed from having to be liquefied again. If electricity is generated with the aid of the additional consumer, said electricity is, in one embodiment of the further invention, stored in a battery or used for charging a battery. The electrical current obtainable from the battery can then be utilized again, for example, for an electric drive of the vehicle or in some other way for the vehicle, for example for a heating and refrigeration machine, or electrical current can be fed into a domestic electrical network via garage cables, or gas can be fed into a domestic gas network.

Since, in general, no large amounts of boil-off gas arise in small LNG tanks, boil-off gas that arises does not pose a central problem. The amounts of boil-off gas that may have to be handled generally correspond to only 5 to 10 W/h in the case of small amounts in passenger motor vehicles. A different situation is encountered in the case of large amounts of LNG in storage and heavy goods vehicle tanks, marine tanks, aircraft tanks and refueling stations. In this case, special measures, such as those described in the first invention of the application, are necessary.

In one embodiment of the further invention, the container for the cryogenic fuel comprises a pressure-resistant outer cladding (container), specifically in particular a preferably cylindrical container composed of high-grade steel with, in general, a high 20% nickel fraction, and a pressure-resistant inner cladding which is situated in said outer cladding and which is resistant to cold temperatures. The inner cladding which is resistant to cold temperatures, and which is composed for example of aramide or Kevlar®, may be separated from the pressure-resistant outer cladding by way of thermal insulation, for example by way of a thermally insulating foil or a thermally insulating coating, in order that the outer cladding is protected against destructive low temperatures. The thermal insulation is composed for example of polyurethane compounds, preferably with aluminum foil. The internal cladding which is resistant to cold temperatures may however simultaneously act as a thermal insulator and be thick enough to protect the external cladding against destructive low temperatures.

A pressure-resistant tank container that is already present in a gas-fuelled vehicle can, through incorporation of a flexible inner cladding which is resistant to cold temperatures and which is manufactured for example from Kevlar®, be converted such that it can store both compressed gas and cryogenic gas, that is to say in particular CNG and LNG. More specific details regarding materials from which the inner cladding can be manufactured emerge from the German patent application 102009029245. The materials, material combinations and further specifications regarding the structure of the inner cladding that are known from said document may also form part of the present application. We hereby include the content of disclosure of said application in this regard as belonging to the present invention.

In one embodiment of the invention, the pressure-resistant tank containers are connected to one another such that all of the tank containers can be refueled with CNG, that is to say can be filled, via one gas feed line. To achieve this, in one embodiment, one gas feed line issues into a two-way valve or into a multi-way valve. From said valve, pipe connections then lead to the pressure-resistant containers. At least the gas feed line, the two-way or multi-way valve and the feed line(s) to the one or more pressure-resistant tank containers, which are simultaneously designed for storing cryogenic liquefied gas, are designed to be resistant to cold temperatures such that cryogenic gas, in particular LNG, can be conducted through without damage to the gas feed line, to the two-way or multi-way valve and to the feed line(s) to the one or more pressure-resistant tank containers. To be able to conduct LNG through, the corresponding component must be able to withstand a temperature of at least −161° C. Such components can preferably withstand temperatures of at least −170° C., because the temperature of LNG is at least −161° C. to −164° C. In one embodiment, the two-way valve or multi-way valve serves for the control of the fuel feed to the pressure containers and/or for the control of the fuel feed from a pressure container to the internal combustion engine. In particular, control can be performed such that LNG is fed only to the one or more pressure containers that is or are designed for storing LNG.

In one embodiment, a feed line that is utilized for refueling of a motor vehicle, that is to say for a feed to the tank of a motor vehicle, is of double-walled design. It is then for example the case that gas is fed to the corresponding motor vehicle tank via the inner pipe of a feed line of said type and liquefied gas is fed via the intermediate space between the inner pipe and the outer pipe, or vice versa. A motor vehicle can then be refueled with liquid gas and with gas simultaneously and therefore in a short time.

It is preferable for not all of the pressure containers to be designed to be resistant to cold temperatures, in order to thereby keep the technical outlay low. Accordingly, in one embodiment, only one tank container is designed to be resistant to cold temperatures, specifically in particular if the fuel accumulator device comprises a total of two or three pressure containers. Resistant to cold temperatures means that the corresponding components are capable of withstanding the cold temperature of the cryogenic gas, that is to say in particular temperatures of LNG, that is to say in particular temperatures of down to −164° C., preferably of −170° C., and preferably also lower.

In one embodiment, to keep the technical outlay low, the tank containers are designed to be pressure-resistant to varying degrees. In this embodiment, a tank container which serves for the storage of gas is designed to be more pressure-resistant than the tank container in which liquefied gas can be stored at the same time. In one embodiment, the tank container which serves for the storage of gas but not of liquefied gas is pressure-resistant to such an extent that it can withstand pressures of greater than 50 bar, preferably of greater than 100 bar. The tank container which is capable of storing liquefied gas is then duly likewise of pressure-resistant design. Its pressure resistance is however considerably lower than the pressure resistance of the tank container in which only gas but not liquefied gas can be stored. The pressure resistance of the tank in which liquefied gas can be stored then lies, for example, between 10 and 50 bar. The regulation of the best possible degree of filling of the available tanks may be performed such that the CNG tanks, as far as possible during user operation for as long as the remaining fuel capacity is sufficient, by evaporation of LNG, the tank for which is limited to bar, holds said pressure constant for as long as possible and fills the CNG tanks individually or jointly with evaporated LNG gas, to the extent that the expansion of the liquefied gas permits this. An additional pressure increase by way of gas compressors should be avoided owing to the higher complexity and the higher inherent energy consumption. This may however also be integrated into the system in the case of extremely long standstill time requirements.

In one embodiment of the invention, pipes and coupling systems connected to a tank container according to the invention are also equipped with, for example wrapped in, a cladding composed of graphene, such that the graphene foil makes a further improved contribution to the gas impermeability.

A foil composed of graphene can, with the aid of a further foil, be easily unwound and applied. Owing to adhesion, graphene adheres very easily and reliably to other surfaces.

The solution according to the invention for improving the range of natural-gas-fuelled vehicles can be easily provided for the vehicle user and can be provided with little outlay without detriment to the engine and its assemblies.

Further advantages and refinements will be illustrated in more detail on the basis of the following description of the figures.

Figure 7:
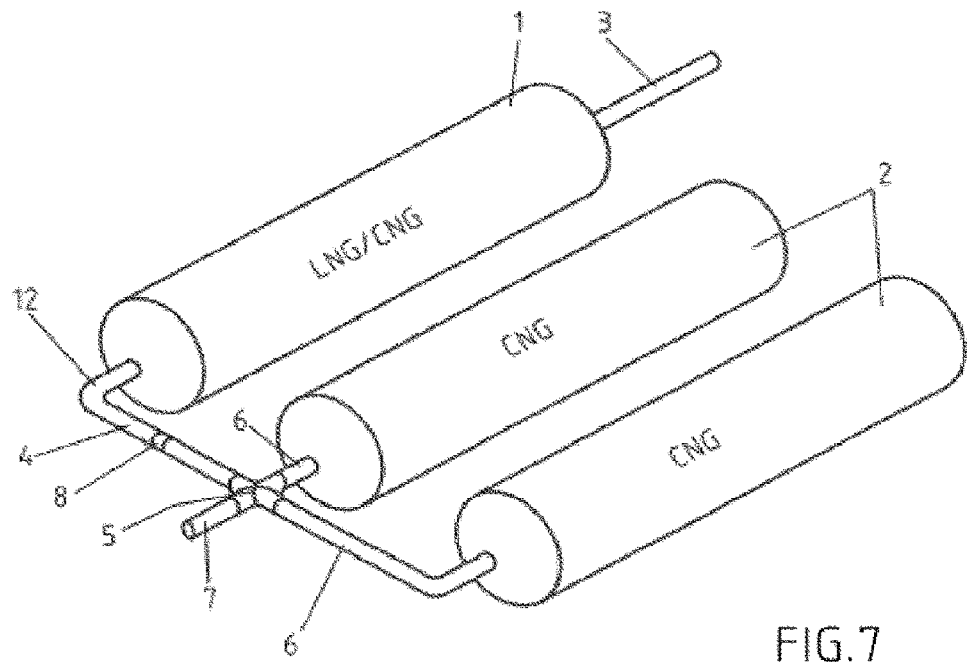
Figure 8:
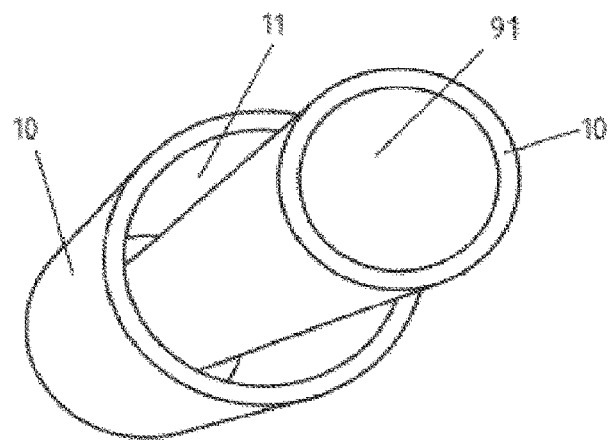
Figure 9:
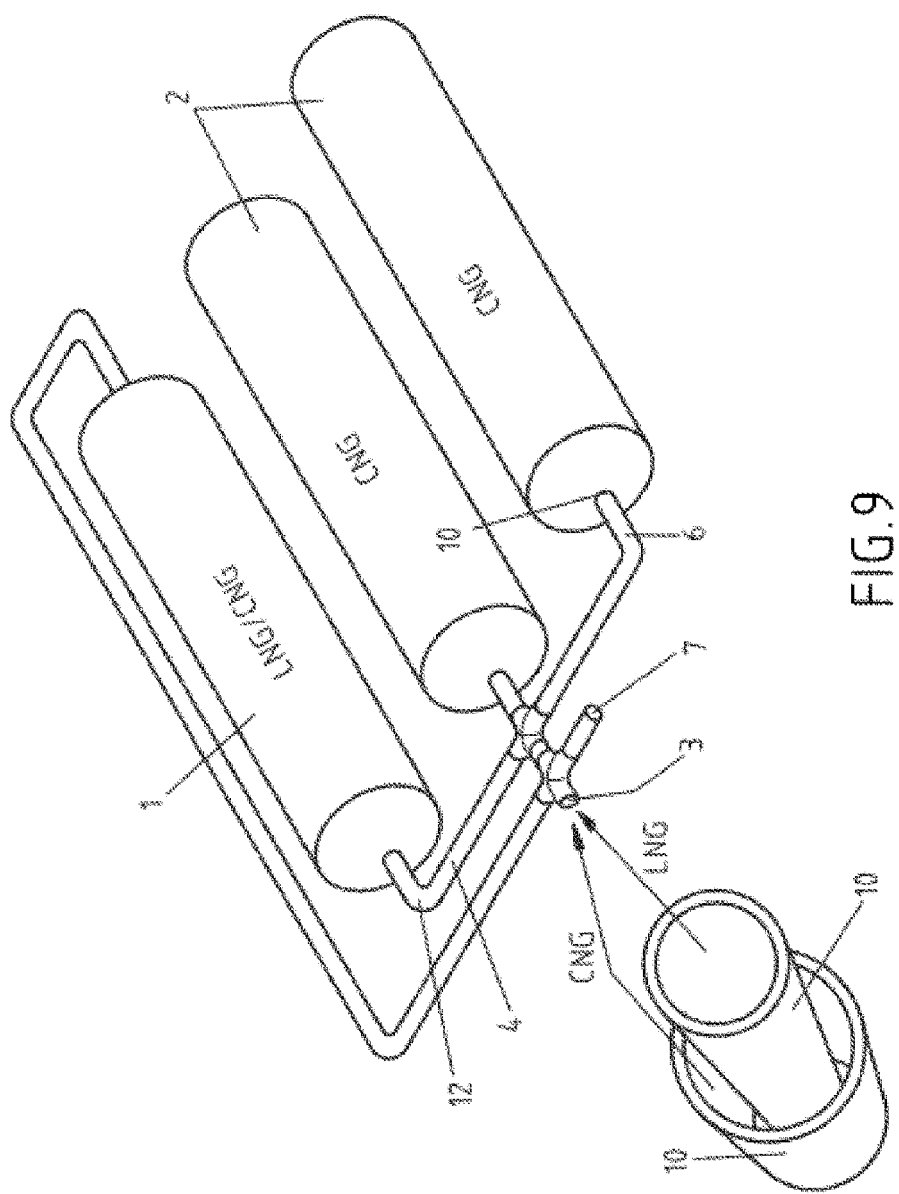
Figure 10:
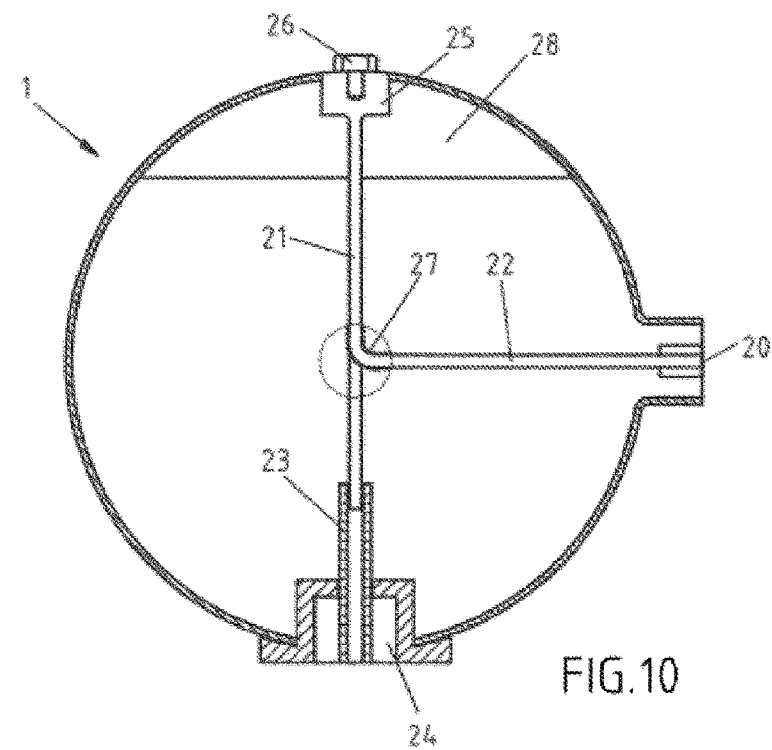
Figure 11:
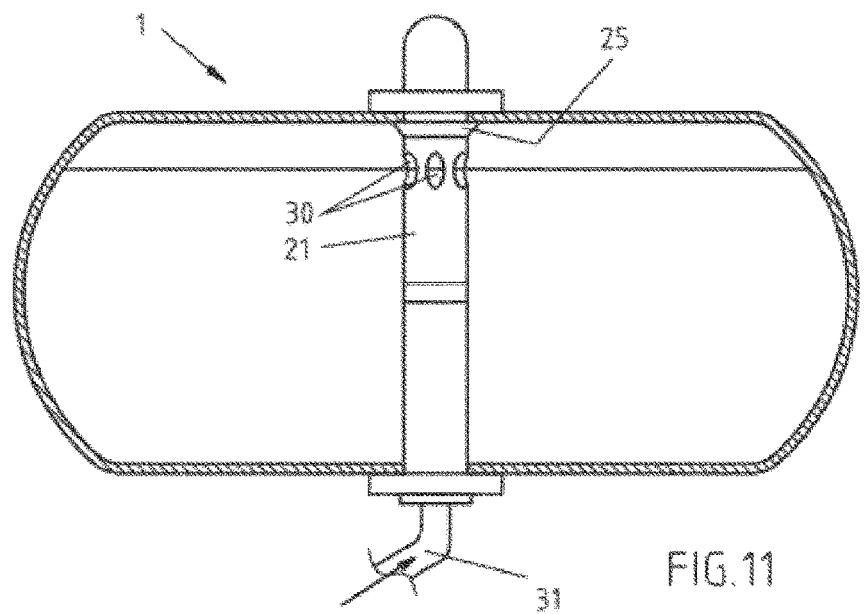
Figure 12:
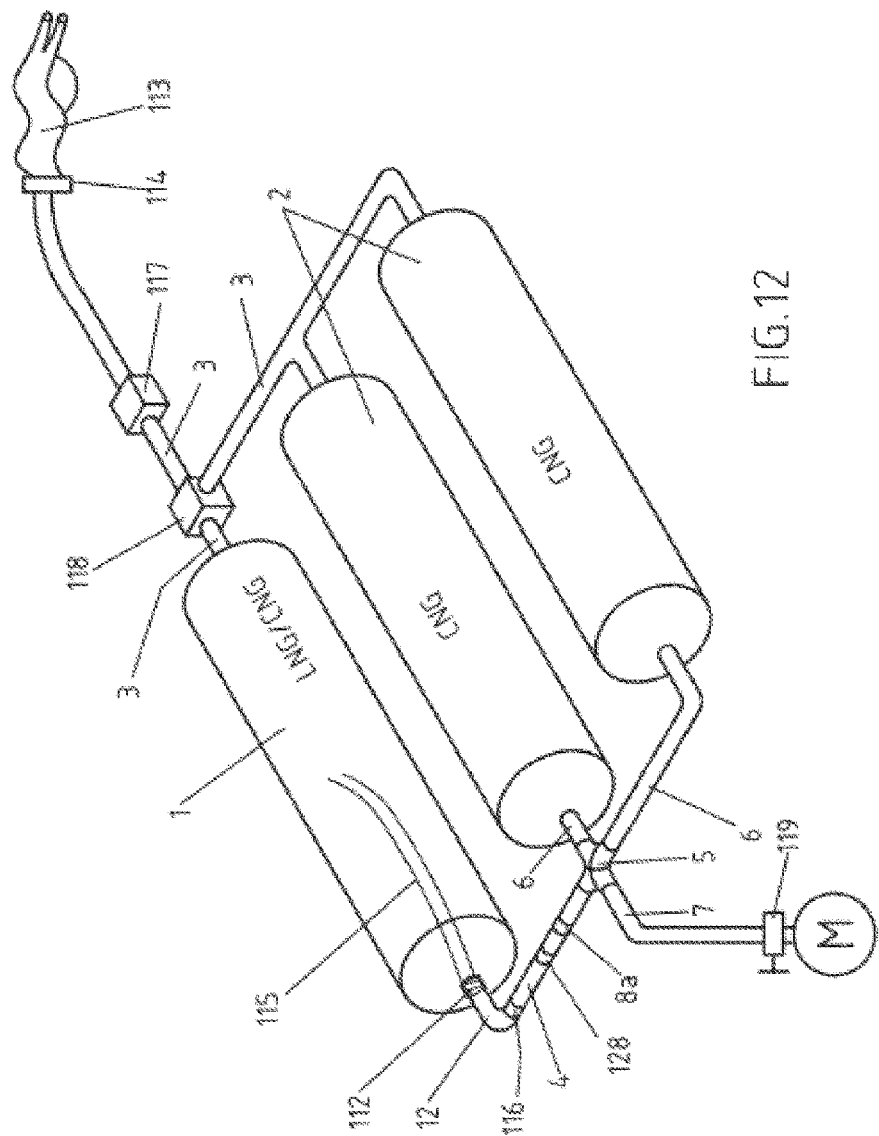
Figure 13:
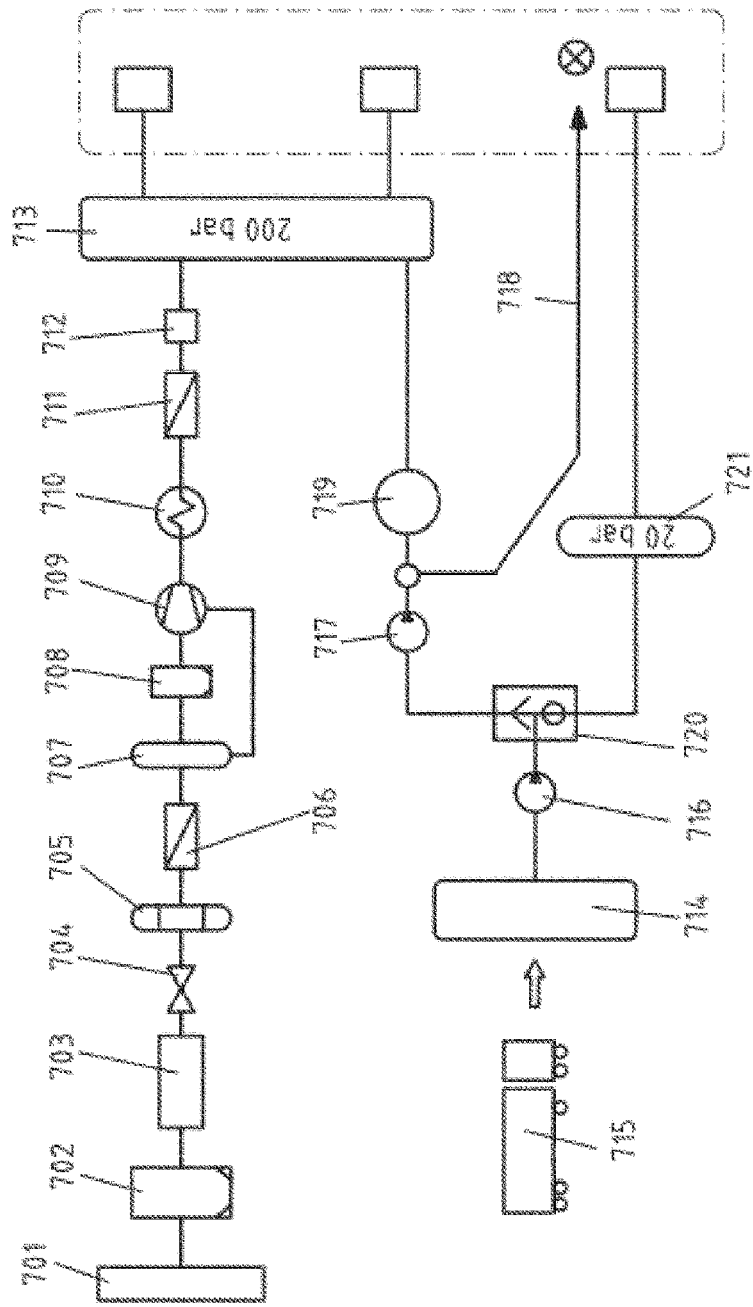

In the figures:

FIG. 7 shows a fuel accumulator device with three pressure-resistant tank containers, FIG. 8 shows a tank neck, FIG. 9 shows a fuel accumulator device with three pressure-resistant tank containers, FIG. 10 shows an LNG tank container, FIG. 11 shows an LNG tank container, FIG. 12 shows a fuel accumulator device with three pressure-resistant tank containers, FIG. 13 shows a refueling station.

The reference designations mentioned below apply only to FIGS. 7 to 13.

FIG. 7 shows a fuel accumulator device having three pressure-resistant tank containers 1, 2. Highly pressurized CNG can be stored in each of the three tank containers 1, 2. All of the three tank containers 1, 2 are composed preferably of steel, or have an embodiment composed of container and Kevlar stocking, as described in the preceding patent description, and can withstand an internal pressure of 250 bar.

One of the three pressure-resistant tank containers, specifically the tank container 1, is furthermore designed to be resistant to cold temperatures such that LNG can be stored therein. The two other tank containers 2 are not designed to be resistant to cold temperatures, so as to keep the technical manufacturing outlay for the fuel accumulator device as low as possible.

A pressure-resistant gas feed line 3 which is resistant to cold temperatures leads into the pressure container 1, which is resistant to cold temperatures, at one side, via which gas feed line highly compressed CNG and LNG can be introduced into the tank container 1, which is resistant to cold temperatures. At an opposite side, a pressure-resistant gas outlet line 4, which for safety reasons is preferably likewise resistant to cold temperatures, leads out of the tank container 1 which is resistant to cold temperatures, and said gas outlet line leads specifically to a pressure-resistant two-way valve 5, which for safety reasons is preferably likewise resistant to cold temperatures. By means of the two-way valve 5, a highly compressed gas can be conducted either to one of the two further pressure containers 2 or, via pressure-resistant pipelines 6, to further pressure containers 2 in order to fill these with gas, or via a pressure-resistant line 7 to the internal combustion engine of the motor vehicle. For safety reasons, the lines 6 may likewise be designed to be resistant to cold temperatures, which is however likewise not imperatively necessary, and may thus also be omitted if the fuel accumulator device is to be manufactured with the least possible technical outlay. Conversely, gas can be conducted from the CNG pressure containers 2 via the two-way valve 5 to the line 7 and from there onward to the internal combustion engine.

The pressure-resistant line 4, which is preferably resistant to cold temperatures, advantageously comprises a pressure-resistant overpressure valve 8, which is preferably resistant to cold temperatures, and/or a throttle valve 12, by means of which a fluid can be prevented from being conducted onward to the two-way valve 5. If, owing to boil-off gas, a positive pressure is generated in the tank container 1 which is resistant to cold temperatures, the overpressure valve opens and permits a gas flow, for example into the respective CNG tank container 2.

For a tank replenishment process, it is firstly the case that highly compressed CNG is introduced into the gas feed line 3 at a pressure which lies below the intended maximum pressure of for example 200 bar. Accordingly, with correspondingly opened or set valves 5, 8 and 12, all three tanks 1, 2 are brought to the desired pressure level. The desired pressure level is for example initially 100 to 130 bar, for example 120 bar.

Depending on the volume of the at least one LNG tank 1 in relation to the at least one CNG tank 2, attention must be paid, during refueling with CNG, to how high the charging pressure, or the desired pressure level, should be, for example the stated pressure level of 120 bar. The pressure level to be selected in each case is dependent on the vehicle or the associated fuel accumulator device and, in one embodiment, is therefore signaled by a corresponding electronic device to the refueling nozzle.

Nevertheless, it is for example the case that, in electronically regulated fashion, LNG fuel is introduced under pressure (for example approximately 1 bar higher than the prevailing CNG pressure) into the tank container 1 which is resistant to cold temperatures, whereby the gas situated in said tank container is displaced. By means of the throttle valve 12, a feed into the pure CNG tank containers 2 can be blocked if required. To achieve that the gas that is initially situated in the tank container that is resistant to cold temperatures is displaced by inflowing LNG without LNG flowing out again from the container that is resistant to cold temperatures, it is advantageously the case that, in the installed state, the line 4 leads out in an upward direction from the container 1 that is resistant to cold temperatures, or ends in the top of the LNG tank container 1 or in a dome of the tank container 1. In particular, the tank container 1 that is resistant to cold temperatures is therefore, in one embodiment, equipped with an upwardly outwardly leading dome, which is then connected to the line 4. By way of the upwardly outwardly leading dome, which has a very much larger diameter or width and depth in relation to a pipeline, it is achieved in a particularly reliable manner that any boil-off gas, rather than inadvertently LNG, escapes first from said pressure container 1 which is resistant to cold temperatures. The dome is preferably arranged centrally in order to achieve the stated desired effect in further improved fashion.

The filling, that is to say refueling, with LNG is preferably performed such that the CNG tank container 2 can be filled only up to approximately 90% of the capacity. Further filling to 100% should not take place for safety reasons (that is to say in order to realize a gas buffer. For this purpose, it is preferably the case that, in electronically regulated fashion, LNG is pumped into the tank container 1 that is resistant to cold temperatures, wherein the electronics automatically stop a feed of LNG when the LNG volume that has been pumped in has reached for example 90% of the volume of the tank container that is resistant to cold temperatures, or when the capacity of 90% in the CNG tank containers has been reached.

For safety reasons, the feed of the liquefied natural gas LNG is preferably performed such that a residual amount of gaseous CNG of approximately 10% with an initial pressure of 200 bar remains in the tank container 1 that is resistant to cold temperatures.

A refueling nozzle that is particularly suitable for this purpose comprises, in one embodiment, a double-walled pipe cross section as shown in FIG. 8. The inner pipe 91 serves preferably for the feed of LNG. Then, the double wall 10 serves for thermal insulation. Furthermore, the region 11 between the two walls 10 serves for the supply of CNG. The prior art relates to regulation and fuel measurement technology at CNG refueling stations which measures the amount to be filled before and during the CNG refueling process. In the present invention of a combination of CNG and LNG, further measures must be implemented.

The operator (refueling station attendant, refueling station customer, car driver or vehicle refueler) must not start the refueling process with LNG if the embodiment shown in FIG. 7 is present and refueling is to be performed with both LNG and CNG. In one embodiment, a corresponding specific shape of the tank neck of the motor vehicle is detected by an electronic regulator, provided for the purpose, of the refueling pump immediately upon insertion (shaping or detector), as a result of which the CNG inflow is enabled. Alternatively or in addition, the motor vehicle is equipped with a regulator which is capable of signaling, and thus controlling, whether refueling with CNG or with LNG is performed. The regulator of the motor vehicle is in particular capable of performing control in a manner dependent on the content of the LNG tank 1, as described above. In preferably electronically controlled fashion, it is for example simultaneously the case that a valve controller opens up the gas line in the vehicle in order that the CNG can flow into all three tanks 1, 2 or individually in sequential fashion.

Whereas the CNG tank 2 is, depending on capacity and design variant, to be filled with CNG to less than 200 bar, the LNG tank 1 in the embodiment shown in FIG. 7 is likewise filled uniformly, like the CNG tank 2, to the same pressure level. This may be achieved by way of a throttle valve 12 which may expediently be installed at the start of the line 4, that is to say adjacent to the tank vessel 1.

The throttle valve 12 at the start of the line 4 may be equipped with a control device by means of which a signal is transmitted to the refueling nozzle when the CNG refueling process is complete, as is already conventional nowadays. According to the invention, the signal may be further utilized for enabling the LNG refueling process.

Then, the inner pipe 91 of the refueling nozzle is opened, and the LNG flows, in one embodiment with a pressure higher than the CNG pressure, into the tank container 1 that is resistant to cold temperatures, for example at 160 bar as liquefied natural gas.

In one embodiment, there is a bypass line which, for safety reasons, is preferably resistant to cold temperatures and which has check valves installed therein, which check valves are, for safety reasons, preferably resistant to cold temperatures; said bypass line leads from the tank container 1, which is resistant to cold temperatures, to the CNG tank containers 2. The bypass line leads in particular upward out of the tank that is resistant to cold temperatures. In this case, the throttle valve 12 is closed, specifically in particular automatically, before the tank container 1, which is resistant to cold temperatures, is filled with LNG. With increasing pressure, the LNG flows into the LNG tank 1 and displaces the CNG out of the LNG tank 1 into the CNG tank 2 via the further bypass line.

A refueling process of said type can be ended by virtue of all three tanks 1, 2 being filled with 200 bar pressure, and the LNG tank being approximately 90% filled with liquefied gas LNG.

The natural gas fuel is basically, as is already the case in all CNG vehicles, extracted in gaseous form and not in liquid form from the for example two CNG tanks 2. If, as a result of the extraction, the pressure in the one or more CNG tanks falls, a replenishing flow of the gas or boil-off gas passes uniformly from the LNG tank 1 into the CNG tank 2 through one or more simple, correspondingly installed overpressure valves 8.

If gas is extracted from the tank containers 1, 2 for consumption, in particular for the engine of the motor vehicle, it is advantageously the case, in one embodiment, that always a certain amount of boil-off gas is likewise simultaneously extracted from the LNG tank 1. Owing to the reduction of the gas pressure as a result of the consumption (engine), the abovementioned fraction of boil-off gas will increase over the course of time. If the boil-off gas that is present is ultimately no longer sufficient, then in one embodiment of the invention, heat is supplied to the LNG for example by way of a heat rod which is filled with cooling water of the engine, in order to intensify the boil-off effect.

That is to say, if more CNG is consumed by the engine then evaporates in the LNG tank 1 owing to boil-off effects, and the CNG tank is already empty, a heat exchanger or a heating device which is provided in one embodiment of the invention ensures that a sufficient amount of gas is generated from the LNG until the tank 1 has been emptied down to the reserve amount, and in one embodiment, a signal to refuel is transmitted to the vehicle driver by way of a corresponding monitoring device. The heat exchanger or the heating device is preferably configured such that gas extracted by way of a supply of heat leads to a slight positive pressure, such that gas can flow to the engine of its own accord. Thus, in this embodiment, no compressor is required to transport gas from the tank 1 to the engine.

Since the LNG gas is purified and is thus generally cleaner than CNG, particularly clean combustion is thus realized, and fewer pollutants are emitted, and the engine or end consumer receives a more homogeneous supply of fuel of the fuel composition. The tank containers 1, 2 may also be shaped differently, in particular such that gas can be conducted out of the pressure containers 1, 2 in an upward direction. For this purpose, the tank containers 1, 2 may be curved in a manner suited to the purpose. A heat exchanger used for the evaporation of LNG may be electrically operated. The heat exchanger may be a pipe in the tank 1 that is resistant to cold temperatures. The tank container 1 that is resistant to cold temperatures is preferably thermally insulated and may, if required, comprise a pump by means of which LNG can be pumped. It is however preferable for no pump to be provided, and for a desired pressure gradient for fuel supply purposes to be generated by evaporation of LNG.

However, in one embodiment of the invention, in a departure from the refueling sequence described above, it is also possible for LNG to be replenished first, for example until a corresponding tank container that is resistant to cold temperatures is 90% filled. Subsequently, a tank container 2 provided for compressed gas can, in the embodiment shown in FIG. 7, be filled with CNG until an intended pressure of for example 200 bar is reached, specifically as a result of evaporation of LNG that is situated in the LNG tank 1. With this sequence, however, refrigeration problems could arise and required heating could lead to time losses, because the lines and valves initially become very cold.

If refueling is to be performed and if the LNG has not yet been fully consumed, it is expediently the case that CNG is firstly replenished until the desired pressure level of, for example, 120 bar has been reached. However, if the desired pressure level of, for example, 120 bar prevails and is reached, LNG is replenished which, by displacement, compresses the CNG until, for example, 200 bar is reached, and all tank containers have been filled to the maximum extent.

By means of the invention, by contrast to conventional CNG refueling stations, it is not necessary for CNG to initially be extracted by suction from motor vehicle tanks before refueling. In this way, time is saved in the refueling process.

FIG. 9 shows another possible configuration. The tanks 1 and 2 are connected by lines such that the LNG tank 1 can be refueled independently of the CNG tank 2. This embodiment makes it possible for CNG and LNG to be replenished simultaneously.

FIG. 10 shows a possible construction of a tank or of a tank container 1 which is capable of accommodating LNG. The tank container 1 may comprise a cylindrical diameter and have an opening 20. The tank container 1 may be a conventional gas bottle. It is possible for a cladding to be inserted through the opening 20, which cladding is composed for example of Kevlar®. The cladding may be of stocking-like form and contribute to the compensation of an internal pressure of 200-300 bar. The outer cladding, which is composed for example of steel or aluminum, is thus relieved of the pressure. Furthermore, a rod 21 may be inserted into the tank container 1, which rod is internally hollow and is capable of serving for conducting LNG or gas. The rod 21 may be designed to be foldable and/or may comprise a hingeable or pivotable branch 22. By folding or pivoting, the rod 21 can be adjusted into a shape such that it can be introduced into the tank container 1 through the opening 20. In the case of FIG. 10, the rod 21 is formed, in the lower region, by a perforated pipe 23. Below the perforated pipe 23 there is provided a device 24 by way of which heat can be supplied. LNG which is situated in the tank container 1 can pass into the interior of the rod 21 through the perforated pipe 23. LNG in the rod is evaporated by way of the supply of heat. The evaporated LNG can then pass either into the gas space 28, specifically for example through an open-pored metal sponge 25, or can exit the tank container 1 through the branch 22, specifically in particular in the direction of the engine of the motor vehicle. The rod 21 can be fastened within the tank container 1 by way of a centering screw 26.

When the rod 21 has been introduced, in the folded state, into the tank container 1, it can be suitably unfolded for example with the aid of cable pulls. The metal sponge 25 may be composed of aluminum or an aluminum alloy. Instead of the metal sponge 25, it is possible for one or more differently designed openings to be provided which lead into the rod 21 at the top. The centering screw 26 may project into the metal sponge 25. A joint 27 which connects the branch 22 pivotably to the rod 21 is composed of flexible material. It may in this case be a corrugated bellows, which is manufactured in particular from metal.

The device 24 is in particular a heat exchanger, such that sealing problems are avoided. Through the metal sponge 25, boil-off gas can be conducted from the gas space 24 into the rod 21. From here, boil-off gas emerges from the tank container 1 via the branch 22.

An LNG tank 1 may comprise the features shown in FIG. 10 individually or in combination, if.

FIG. 11 shows a further possible embodiment of a tank container 1 in which LNG can be stored. In the upper region, there is a metal sponge 25 via which boil-off gas can be conducted into the rod 21. Instead of a metal sponge 25, it is possible for one or more differently designed openings to be provided which lead into the rod 21 at the top. Via the rod 21, gas can be both conducted out of the tank container 1 and introduced into the latter in the form of LNG. The rod 21 has, in the upper region, a perforation 30 or a differently designed feeder means via which LNG can pass from the rod 21 into the interior space of the tank container 1. Situated at the underside of the tank container 1 is the feed line 31, which is connected to the rod 21. The feed line 31 serves simultaneously for the extraction of boil-off gas from the tank container 1.

FIG. 12 shows a refueling nozzle 113 by means of which the fuel, that is to say gas and liquefied gas, can be introduced into the line 3. The refueling nozzle 113 is preferably designed as illustrated in FIG. 2. The line 3 comprises in particular a signaling device 114. The signaling device serves for transmitting to the refueling station, indirectly or directly, information to the effect that a vehicle is to be refueled which can be refueled both with gas, that is to say in particular CNG, and with liquefied gas, that is to say in particular LNG.

The signaling device 114 may be or comprise a double valve, with the aid of which the refueling with gas and liquefied gas is made possible.

The line 3 preferably comprises a distributor 118. The distributor 118 makes it possible firstly for liquid gas to be introduced into one or more tanks 1 provided for this purpose. The distributor 118 secondly makes it possible for gas to be introduced into one or more tanks 2 provided for this purpose via the branching line 3.

The line 3 is preferably designed, at least as far as the distributor 118, that is to say the region shown between the refueling nozzle 113 and the distributor 118 in FIG. 6, as a double-walled pipe. The pipe 3 therefore has, in the abovementioned region, an inner pipe and an outer pipe. Between the inner pipe and the outer pipe there remains a ring-shaped space. The inner pipe serves preferably for the feed of LNG. The ring-shaped space then serves for the feed of gas and at the same time for thermal insulation. Also possible, however, is a reversed usage situation, such that LNG is supplied via the ring-shaped space. This manner of use however has the disadvantage that, then, the ring-shaped space cannot be utilized for thermal insulation for LNG, which is fed through the inner pipe.

The inner pipe of the line 3 preferably has a thermal insulation layer in order that LNG conducted through the inner pipe is protected in further improved fashion against a supply of heat. In this embodiment, the distributor 118 ensures that CNG introduced through the ring-shaped space is conducted to the one or more CNG tanks 2, and LNG conducted through the inner space or through the inner pipe is conducted into the one or more LNG tanks 1.

The distributor 118 preferably comprises a valve (not illustrated) which makes it possible for CNG to also be introduced into the LNG tank if required. It is preferably alternatively or additionally possible for to be introduced via the in FIG. 12 the one or more LNG tanks.

Firstly, in the case of a device as shown in FIG. 12, it is possible for gas such as CNG to be introduced into the tanks 1 and 2, for example with a pressure from 50 to 150 bar, for example 100 bar. When, finally, a pressure of 50 to 150 bar, for example 100 bar, likewise prevails in the tanks 1 and 2, the gas replenishment process is complete. Subsequently, liquefied gas such as LNG is fed to the one or more tanks 1. The liquefied gas forces the gas out of the one or more tanks 1 and into the other tanks 2. In this embodiment of the invention, the one or more tanks 1 are also of suitably pressure-resistant design.

In the abovementioned embodiment, gas, in particular CNG, heated by compression is introduced into the one or more tanks 1, which tank or tanks should however be kept cool in the interior space. If the one or more tanks 1 which serve for the storage of liquefied gas are instead heated by heated gas, this can firstly give rise to difficulties owing to thermal expansion and shrinkage. Secondly, energy is required in order to subsequently cool the one or more tanks.

In one embodiment, therefore, the line 3 that leads from the distributor 118 to the pressure-resistant tank 2, as shown in FIG. 6, is utilized such that, during a refueling process, gas is introduced only into the one or more pressure-resistant tanks 2 but not into the one or more tanks 1 which serve for the storage of liquefied gas. This avoids a situation in which the one or more tanks 1 which serve for the storage of liquefied gas are heated by gas beforehand. The tanks 1 and 2 are preferably filled simultaneously with gas and liquefied gas, that is to say in particular LNG and CNG, during a refueling process, in order to correspondingly accelerate the refueling process. It is then the case in particular that LNG is fed in via the interior space of the double pipe 3, that is to say the inner pipe that leads to the distributor 118, and CNG is simultaneously fed in via the ring-shaped space. The distributor 118 then distributes the fuels to the one or more CNG tanks 2 and/or the one or more LNG tanks 1 in the intended manner. This avoids a situation in which one or more LNG tanks 1 are initially heated as a result of the refueling process and must then subsequently be cooled down again. It is also possible for the one or more tanks 1 that are provided for the storage of liquefied gas to be refueled with liquefied gas without problems regardless of whether or not residues of liquefied gas were present therein at the start of a refueling process.

In one embodiment of the invention, it is provided that all of the tanks 1 and 2 are refueled with the same pressure, that is to say the same pressure prevails in the one or more tanks as in the one or more tanks 2. It is however preferable for the one or more tanks 1 to be decoupled in terms of pressure from the one or more tanks 2, such that a lower pressure, of for example only 20 bar, can be provided in the one or more tanks 1. This makes it possible for the manufacturing outlay for the one or more tanks 1 which serve for the storage of liquefied gas to be kept low.

If gas and liquefied gas are supplied simultaneously via the line 3 at the same pressure, this firstly has the advantage that, via the line 3 which leads from the refueling nozzle 113 to the distributor 118, the same pressure prevails both in the interior space and in the ring-shaped space. In this embodiment, it is not necessary for the dividing wall of the inner pipe, which dividing wall separates the interior space from the ring-shaped space, to be designed to be stable under pressure. The manufacturing outlay for said section of the line 3 can be correspondingly kept low. Furthermore, this refueling method is associated with the advantage that boil-off gas that forms in the one or more tanks 1 can be introduced into the one or more tanks 2 simply through an overpressure valve when a corresponding pressure difference arises owing to boil-off gas that has formed.

The line 4 preferably comprises one or more liquid separators 112, specifically in particular adjacent to the one or more tanks 1 which serve for the storage of liquefied gas. This prevents a situation in which emergence of boil-off gas from the one or more tanks 1 into the line 4 could result in liquefied gas such as LNG being able to pass into the one or more gas tanks 2, which could result in damage or faults.

FIG. 12 illustrates an optionally provided compensation device 128 which is capable of compensating thermally induced changes in length of the line 4. The compensation device 128 is for example a corrugated bellows, such that variations owing to temperature changes can be compensated.

In one embodiment of the invention, the line 4 is equipped with a heat exchanger 116 or a heating device 116, which is preferably arranged close to the outlet of the one or more liquefied gas tanks 1. In this way, a fluid originating from the one or more liquefied gas tanks 1 can initially be heated. Icing effects that can lead to damage or obstructions can thus be avoided.

The feed line 7 to the engine preferably comprises a regulator 119 and/or a pressure-reducing means 119 for enabling the pressure of the gas that is conducted to the engine to be reduced. For example, it may be provided, as standard, that gas at a pressure of 8 bar is introduced into the engine. The component 119 ensures that the gas pressure is correspondingly reduced as required.

Each liquefied gas tank 1 preferably comprises a line 115 which has an open end in an upper region of the tank. Boil-off gas collects in said upper region, which boil-off gas can then be forced out via the line 115, specifically into the line 4.

In one embodiment of the invention, each liquefied gas tank 1 is equipped with a heating device or a heat exchanger. In this way, it is possible for heat to be supplied to the liquefied gas situated in each liquefied gas tank 1 as required, in order to evaporate liquefied gas. The evaporated liquefied gas can then be fed into the line 4 and supplied for example to the engine.

A refueling station for CNG, which refueling station is connected to a pipeline 701 generally comprises the following components, shown in FIG. 13: a gas filter 702 with connected gas meter 703, followed by a shut-off device 704, a gas dryer 705, a backflow preventer 706, an expansion volume 707, a gas filter 708, a compressor 709, a cooler 710, a backflow preventer 711, and a priority controller 712, in order to thus ultimately be able to provide, in a gas accumulator 713, CNG at a pressure of 200 bar for the refueling of a motor vehicle with natural gas. In the case of a refueling station of said type, the compressor 709 is a problem because a high level of manufacturing outlay must be expended for it, and it is furthermore susceptible to faults and requires a large amount of energy to compress a compressible gaseous medium, whereby the secondary energy outlay is increased, and the energy balance and emissions balance are made worse.

To alleviate this problem, LNG situated in a tank, which LNG can be delivered by heavy goods vehicle 715, is initially compressed to, for example, 20 bar by pumping by way of a pump 716 arranged outside the tank. By way of a further downstream pump 717, it is then possible for LNG to be brought to a pressure of, for example, 200 bar, that is to say the pressure that is commonly generated by a compressor in order to compress gas, that is to say natural gas, to 200 bar. With the aid of a regulating valve 720, it is possible to control the inflow to the pump 717 which is capable of generating a very high pressure of, for example, 200 bar.

Subsequently, said LNG, which has been brought to, for example, 100 bar, can be introduced in the liquid state into a corresponding vehicle as required via a bypass 718. Furthermore, by way of a branch, said LNG that has been brought to approximately 100 bar can be fed to an evaporator with expansion container 719, which is thus capable of providing gas at a pressure of 250 bar. Correspondingly, the operation of the compressor 709 can be reduced. It is even possible to dispense entirely with the components 701 to 712, which serve for the provision of CNG, which is generally fed to the refueling station via a pipeline 701.

In one embodiment, the LNG, which has been brought to a relatively low pressure of for example 20 bar by way of the pump 716 without great energy outlay because said LNG is in liquid and approximately incompressible form, is used for filling an LNG tank of a motor vehicle which is designed for 20 bar with LNG. The control is again performed with the aid of the regulating valve 720. LNG which has been brought to, for example, 20 bar and which is to be introduced into a correspondingly pressure-resistant LNG tank of a motor vehicle is then preferably accumulated in a pressure buffer accumulator 721. For refueling of an LNG tank of a motor vehicle, LNG is extracted from the pressure buffer accumulator 721.

An LNG tank of a motor vehicle is preferably filled only up to 90% in order that a gas bubble remains. If LNG is replaced atmospherically, as is conventional nowadays, the pressure in the gas bubble slowly rises owing to isolation-induced boil-off. If it is now predominantly CNG from the CNG tanks that is consumed, the pressure in the CNG tanks falls from, for example, 200 bar. If a pressure of, for example, approximately bar is finally reached in this way, it is then possible for boil-off gas to be expanded out of the LNG tank at a pressure of approximately 20 bar and admixed or added to the engine to the CNG gas, because said LNG boil-off gas is extracted in still very cold form—as it is close to the boiling point—from the LNG tank, has an energetic expansion gradient and expands to 30 bar and higher. This expansion affect can be utilized without mechanically rotating parts and without a supply of energy. The boil-off gas can, in the LNG tank, rise for example to 50 bar threshold pressure and thus, after expansion, reach over 120 bar; this is a very energy-efficient effect that can be used for the charging of the CNG tank. The LNG tank is then of correspondingly pressure-tight design.

In one embodiment of the invention, a device is provided by means of which the contents of the LNG tank can be heated in order to achieve controlled boil-off, and in order to thus be able to fill the CNG tank in regulated fashion as required. Said device may be an immersion heater within the tank, or else a device which is capable of heating the tank from the outside.

Said device is required if boil-off gas cannot be delivered quickly enough when the gas reserve in the CNG tank has been consumed to a corresponding extent.

For the further invention, the following claims are disclosed for solving the problem addressed by the further invention:

1. A fuel accumulator device having at least two pressure-resistant tank containers (1, 2) for the accumulation of compressed gas, specifically in particular of pre-compressed natural gas, characterized in that at least one tank container (1) is designed to be resistant to cold temperatures, in such a way that it is capable of accumulating the gas in cryogenic, liquid form, specifically in particular of accumulating LNG.

2. The fuel accumulator device as claimed in claim 1, characterized in that the two pressure-resistant tank containers (1, 2) can withstand an internal pressure of at least 100 bar, preferably of at least 200 bar.

3. The fuel accumulator device as claimed in one of the preceding claims, characterized in that the tank container (1) designed for the storage of cryogenic gas comprises a pressure-resistant outer cladding and an inner cladding which is resistant to cold temperatures.

4. The fuel accumulator device as claimed in one of the preceding claims, characterized in that at least one, preferably at least two pressure containers (2) are provided which are not resistant to cold temperatures, and/or at least one, preferably exactly one, tank container (1) is resistant to cold temperatures.

5. The fuel accumulator device as claimed in one of the preceding claims, characterized in that all of the tank containers (1, 2) are connected to one another by lines (4, 6) such that all of the tank containers can be filled with gas via precisely one gas feed line (3) and/or the gas pressure in each tank container (1, 2) can stabilize at a mean pressure after expansion, in an evaporator expansion vessel, of the of tank container 1 to the pressure level of the tank container 2 temperature mixed.

6. The fuel accumulator device as claimed in one of the preceding claims, characterized in that a gas feed line (3) which is resistant to cold temperatures issues into the tank container (1) which is resistant to cold temperatures.

7. The fuel accumulator device as claimed in one of the preceding claims, characterized in that one or more pressure containers (1, 2), in particular the pressure container (1) which is designed to be resistant to cold temperatures, are equipped with a dome at the top side, via which dome gas can be conducted out of the pressure container (1, 2), specifically in particular to the internal combustion engine or, in the case of the pressure container (1) which is resistant to cold temperatures, to a pressure container (2) which is not resistant to cold temperatures.

8. The fuel accumulator device as claimed in one of the preceding claims, characterized in that the pressure container (1) which is resistant to cold temperatures and one or more pressure containers (2) that are not resistant to cold temperatures are connected to one another via an overpressure valve such that, in the event of a relatively high pressure prevailing in the pressure container (1) that is resistant to cold temperatures, the overpressure valve opens and gas can flow from the pressure container (1) that is resistant to cold temperatures into the one or more pressure containers (2).

9. The fuel accumulator device as claimed in one of the preceding claims, characterized in that an evaporator expansion vessel is provided which adjoins the tank (1) that is resistant to cold temperatures.

10. The fuel accumulator device as claimed in one of the preceding claims, characterized in that a heat exchanger for a controlled evaporation of LNG is provided so as to adjoin the tank (1) that is resistant to cold temperatures.

11. The fuel accumulator device as claimed in one of the preceding claims, characterized in that the tank container (1) that is resistant to cold temperatures comprises a rod (21) which is foldable or which comprises a pivotable branch (22).

12. The fuel accumulator device as claimed in one of the preceding claims, characterized in that the tank container (1) that is resistant to cold temperatures comprises a rod (21) which is equipped, on one end, with a metal sponge (25) and/or which is equipped, on one end, with a heat exchanger (24) and/or which comprises a permeable section (23, 30).

13. A motor vehicle having a fuel accumulator device as claimed in one of the preceding claims.

14. A method for refueling a motor vehicle as claimed in the preceding claim, characterized in that, firstly, gas is introduced into all of the pressure tanks (1, 2), and subsequently, LNG is introduced into the tank that is resistant to cold temperatures, displacing the gas situated therein into one or more further pressure tanks (2).

15. The method as claimed in the preceding claim, in which the refueling is performed by way of a refueling nozzle which comprises an inner pipe (9) via which LNG is replenished, and wherein the inner pipe is formed by way of a double wall (1), and CNG is replenished via said double wall (10), specifically preferably in electronically regulated fashion.

16. A method for operating a motor vehicle as claimed in the preceding claim directed to a motor vehicle, characterized in that gas exclusively from the one or more tank containers, which gas is situated in one or more tank containers (2) in which exclusively gas is situated, is conducted to the internal combustion engine.

The abstract of the further invention reads as follows:

A fuel accumulator device according to the invention comprises at least two pressure-resistant tank containers for the accumulation of gas, specifically in particular of natural gas and/or biomethane gas. These are for example at least two cylindrical pressure containers which may be composed of steel or plastic with graphene coating. At least one tank container is of pressure-resistant design in order that it can store intensely compressed gas at very high pressure therein. A pressure-resistant container within the meaning of the present invention is a container which is capable of withstanding an internal pressure considerably higher than atmospheric pressure. The two pressure containers are in particular designed such that the pressure may amount to at least 100 bar, preferably at least 200 bar, for example up to 250 bar. A cryogenic gas, specifically in particular LNG and/or bioLNG, can be stored at least in one container or tank container.

By means of the claimed solution, it is made possible to refuel with and use LNG and/or bioLNG for covering large distances, which leads to long ranges without the need to ensure, over many days, a reliquefaction of LNG that has evaporated in the tank container (so-called boil-off gas). If, over the short term, no great distances will be traveled, the motor vehicle is refueled in a known manner with natural gas or biomethane gas. Then, no storage problems owing to boil-off gas will arise over the medium or long term.

The invention claimed is:

1. A tank adapted for the accumulation and storage of a cryogenic medium, the tank comprising a container with an opening and a cover, wherein a cladding completely covers an inner wall of the container and completely covers an outer wall of the container,
   wherein the cladding is of unipartite form, and
   wherein the cladding includes a foil or a woven material, wherein the cladding is folded over the opening of the container, and wherein the cladding provides both an innermost layer of the container and an outermost layer of the container.

2. The tank of claim 1, wherein the cladding includes one of a hose form and a stocking form.

3. The tank of claim 1, wherein an opening of the cladding is closed off in one of a non-positively locking fashion and positively locking fashion.

4. The tank of claim 1, wherein the woven material comprising at least one of aramide, graphene carbon nanotubes and a flexible plastics foil with graphene coating.

5. The tank of claim 1, wherein the cladding comprises at least one of an aramide cladding and a woven material, the at least one of an aramide cladding and a woven material having at least one of varying diameters and varying densities.

6. The tank of claim 1, wherein the cladding bears in wound form against the container in multiple layers at least one of the inside and at the outside.

7. The tank of claim 1, wherein the container comprising a compressible and thermally insulating material.

8. The tank of claim 1, wherein the container is coated on at least one of the inside and the outside.

9. The tank of claim 1, wherein the cover, which adjoins the cladding of the container, is connected to the opening in one of a positively locking fashion, a non-positively locking fashion, and a cohesive fashion.

10. The tank of claim 1, wherein the cover has at least one of a passage and a valve.

11. The tank of claim 1, wherein the container is narrowed toward the opening.

12. The tank of claim 1, wherein the cover is configured to move between an open position and a closed position, wherein the cover comprises—an inner part relative to the container and an outer part relative to the container, and at least one of the inner part and the outer part has a magnet.

13. The tank of claim 1, wherein the container comprises at least two parts which are connected to one another by way of a self-expanding sealing element.

14. The tank of claim 1, wherein the cladding bears in wound form against the container in multiple layers at the inside such that the cladding forms a closed chamber in which—there is arranged a spiral-shaped encircling cooling line, and wherein a temperature-dependent or pressure-dependent feed and discharge of coolant is provided.

15. A staged tank comprising multiple tanks, each tank adapted for the accumulation and storage of a cryogenic medium and including a container with an opening and a cover, wherein a cladding completely covers an inner wall of the container and completely covers an outer wall of the container, wherein the cladding is of unipartite form, wherein the cladding includes a foil or a woven material, wherein the cladding is folded over the opening of the container, and wherein the cladding provides both an innermost layer of the container and an outermost layer of the container, and wherein the multiple tanks are connected to one another such that the medium can pass from one into another of the multiple tanks.

16. The staged tank of claim 15, wherein the multiple tanks are configured such that LNG and biological methane gas can be stored in the multiple tanks simultaneously.

17. The staged tank of claim 15, wherein the multiple tanks are configured such that a mixture of LNG and biological methane gas can be stored and mixed in the multiple tanks.

18. The staged tank of claim 15, wherein the multiple tanks are configured such that LNG and compressed natural gas CNG can be stored alternately in the multiple tanks.

19. The staged tank of claim 15, wherein the multiple tanks are configured such that gases of different consistency in liquid or gaseous form can be stored under pressure alternately in the same tanks.

* * * * *